United States Patent
Schollenberger et al.

(10) Patent No.: US 9,976,890 B2
(45) Date of Patent: *May 22, 2018

(54) VIBRATING FLOWMETER AND RELATED METHODS

(71) Applicant: Micro Motion, Inc., Boulder, CO (US)

(72) Inventors: Frederick Scott Schollenberger, Boulder, CO (US); Martin Andrew Schlosser, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/126,346

(22) PCT Filed: Apr. 7, 2014

(86) PCT No.: PCT/US2014/033188
§ 371 (c)(1),
(2) Date: Sep. 15, 2016

(87) PCT Pub. No.: WO2015/156763
PCT Pub. Date: Oct. 15, 2015

(65) Prior Publication Data
US 2017/0082473 A1     Mar. 23, 2017

(51) Int. Cl.
*G01F 1/84*     (2006.01)

(52) U.S. Cl.
CPC .......... *G01F 1/8427* (2013.01); *G01F 1/8431* (2013.01); *G01F 1/8436* (2013.01); *G01F 1/8477* (2013.01)

(58) Field of Classification Search
CPC ..................................................... G01F 1/84
See application file for complete search history.

(56) References Cited

U.S. PATENT DOCUMENTS

| | | | | |
|---|---|---|---|---|
| 4,187,721 A | | 2/1980 | Smith | |
| RE31,450 E | * | 11/1983 | Smith | G01F 1/8413 73/32 A |
| 4,852,410 A | * | 8/1989 | Corwon | G01F 1/8413 73/861.355 |
| 4,856,346 A | * | 8/1989 | Kane | G01F 1/8413 73/861.355 |
| 6,227,059 B1 | * | 5/2001 | Schott | G01F 1/8427 73/861.356 |

(Continued)

FOREIGN PATENT DOCUMENTS

| | | |
|---|---|---|
| JP | 54-052570 A | 4/1979 |
| JP | 2011-033439 A | 2/2011 |

(Continued)

*Primary Examiner* — Jewel V Dowtin
(74) *Attorney, Agent, or Firm* — The Ollila Law Group LLC

(57) ABSTRACT

A flowmeter is provides that includes a sensor assembly and meter electronics. The flowmeter comprises one or more rigid flow tubes, a driver coupled to the flow tubes that is oriented to induce a drive mode vibration in the flow tubes. Two or more strain gages are coupled to the one or more rigid flow tubes and oriented to sense tension and compression of the flow tubes. One or more bridge circuits is in electrical communication with the two or more strain gages, wherein outputs of the bridge circuits are proportional to a strain detected by at least one of the strain gages.

47 Claims, 14 Drawing Sheets

(56) References Cited

U.S. PATENT DOCUMENTS 6,684,715 B1 * 2/2004 Cage ............... G01F 1/8427
73/861.357
2017/0082474 A1 * 3/2017 Schlosser ......... G01F 1/8427

FOREIGN PATENT DOCUMENTS

WO         0042393 A1   7/2000
WO   2005010470 A2   2/2005

* cited by examiner

VIBRATING FLOWMETER AND RELATED METHODS

FIELD OF THE INVENTION

The embodiments described below relate to vibrating meters, and more particularly, to improved vibrating flowmeters utilizing strain gages as signal pickoffs.

BACKGROUND

Vibrating conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the conduit and the material contained therein.

It is well known to use vibrating flowmeters to measure mass flow and other properties of materials flowing through a pipeline. For example, vibrating Coriolis flowmeters are disclosed in U.S. Pat. No. 4,491,025 issued to J. E. Smith, et al. of Jan. 1, 1985 and also Re. 31,450 to J. E. Smith of Nov. 29, 1983. These flowmeters have one or more fluid tubes. Each fluid tube configuration in a Coriolis mass flowmeter has a set of natural vibration modes, which may be of a simple bending, torsional, radial, lateral, or coupled type. Each fluid tube is driven to oscillate at resonance in one of these natural modes. The vibration modes are generally affected by the combined mass, stiffness, and damping characteristics of the containing fluid tube and the material contained therein, thus mass, stiffness, and damping are typically determined during an initial calibration of the flowmeter using well-known techniques.

Material flows into the flowmeter from a connected pipeline on the inlet side of the flowmeter. The material is then directed through the fluid tube or fluid tubes and exits the flowmeter to a pipeline connected on the outlet side.

A driver, such as a voice-coil style driver, applies a force to the one or more fluid tubes. The force causes the one or more fluid tubes to oscillate. When there is no material flowing through the flowmeter, all points along a fluid tube oscillate with an identical phase. As a material begins to flow through the fluid tubes, Coriolis accelerations cause each point along the fluid tubes to have a different phase with respect to other points along the fluid tubes. The phase on the inlet side of the fluid tube lags the driver, while the phase on the outlet side leads the driver. Sensors are placed at two different points on the fluid tube to produce sinusoidal signals representative of the motion of the fluid tube at the two points. A phase difference of the two signals received from the sensors is calculated in units of time.

The phase difference between the two sensor signals is proportional to the mass flow rate of the material flowing through the fluid tube or fluid tubes. The mass flow rate of the material is determined by multiplying the phase difference by a flow calibration factor. The flow calibration factor is dependent upon material properties and cross sectional properties of the fluid tube. One of the major characteristics of the fluid tube that affects the flow calibration factor is the fluid tube's stiffness. Prior to installation of the flowmeter into a pipeline, the flow calibration factor is determined by a calibration process. In the calibration process, a fluid is passed through the fluid tube at a given flow rate and the proportion between the phase difference and the flow rate is calculated. The fluid tube's stiffness and damping characteristics are also determined during the calibration process as is generally known in the art.

One advantage of a Coriolis flowmeter is that the accuracy of the measured mass flow rate is largely not affected by wear of moving components in the flowmeter, as there are no moving components in the vibrating fluid tube. The flow rate is determined by multiplying the phase difference between two points on the fluid tube and the flow calibration factor. The only input is the sinusoidal signals from the sensors indicating the oscillation of two points on the fluid tube. The phase difference is calculated from the sinusoidal signals. Since the flow calibration factor is proportional to the material and cross sectional properties of the fluid tube, the phase difference measurement and the flow calibration factor are not affected by wear of moving components in the flowmeter.

A typical Coriolis mass flowmeter includes one or more transducers (or pickoff sensors), which are typically employed in order to measure a vibrational response of the flow conduit or conduits, and are typically located at positions upstream and downstream of the driver. The pickoff sensors are connected to electronic instrumentation. The instrumentation receives signals from the two pickoff sensors and processes the signals in order to derive a mass flow rate measurement, among other things.

Typical Coriolis flowmeters measure flow and/or density through the use of a coil and magnet as a pickoff sensor to measure the motion of a meter's vibrating flow tube/tubes. The mass flow rate through the meter is determined from the phase difference between multiple pickoff signals located near the inlet and outlet of the meter's flow tubes. However, it is possible to measure flow using strain gages in place of coil/magnet pickoffs. A fundamental difference between the two sensor types is that coil/magnet pickoffs measure the velocity of the flow tubes and strain gages measure the strain of the flow tubes which is proportional to the tubes' displacement. As such, the placement of each type of sensor will not necessarily be in the same location.

Strain gages have a number of advantages over coil/magnet pickoffs. Strain gages are cheaper to produce and implement than coil/magnet pickoffs. They also help to eliminate point masses that may adversely affect system operation. Additionally, strain gages do not need a reference point from where to measure strain like coil/magnet pickoffs. This allows for single flow tube designs that are not possible with coil/magnet pickoffs.

Although prior art attempts have been made to provide a means for utilizing strain gages instead of magnet/coil pickoffs for flowmeters, the practical applications of these attempts are relatively limited. A known problem is that strain gages have difficulty resolving strain of relatively thick metal flow tubes. In particular, Coriolis forces are barely discernable over background signals due to the extremely small tension and compression forces that result from fluid flow. Therefore changes in gage resistance are quite small and difficult to measure accurately. For this reason, prior art devices often rely on attaching projections from the flow tubes to measure strain changes in these associated structures, and not on the flow tube itself or using softer materials in construction that are more susceptible to strain. For example, U.S. Pat. No. 6,748,813 discloses strain gages attached to silicone arms that are connected to a flowmeter flow tube. Strain in the silicone is measured for flow calculations. By adding bars or protrusions to flow tubes, this creates an undesirable point mass that may affect meter performance. U.S. Pat. No. 7,500,404, on the other hand, discloses soft tubes for use as flow tubes, or rigid tubes that have soft regions that can experience greater levels of strain than ridged tubes. For sustained industrial applications, the use of soft tubes is not practical due to potentially high pressures, high temperatures, and caustic properties of fluids within the tubes. Soft materials such as silicone have drastically lower tensile strength as compared to stainless steel, for example—a preferred material for industrial flowmeter flow tubes.

Another problem with strain gages is that they are susceptible to DC drift, which makes a steady phase calculation difficult, and thus yielding inaccurate flow rate readings.

The embodiments described below overcome these and other problems and an advance in the art is achieved. The embodiments described below provide a flowmeter with strain gages to detect strain of the flow tube. By connecting various combinations of strain gages having varying placements and orientations on a flowmeter with various combinations of bridge circuits, signal amplification and background cancellation is accomplished. A high-pass filter is utilized to mitigate DC drift issues, while amplification and filter circuitry is disclosed that provides an apparatus and method to electrically process strain signals in the absence of pre-meter electronics digital signal processing. By processing signals with analog circuitry prior to input into meter electronics, strain gages may easily be adapted for use in flowmeter units that were originally designed for coil/magnet type pickoffs.

SUMMARY OF THE INVENTION

A flowmeter including a sensor assembly and a meter electronics is provided according to an embodiment. According to an embodiment, the flowmeter comprises one or more rigid flow tubes and a driver coupled to the one or more rigid flow tubes. The driver is oriented to induce a drive mode vibration in the one or more rigid flow tubes. Two or more strain gages are coupled to the one or more rigid flow tubes and oriented to sense at least one of a tension and compression in the one or more rigid flow tubes. One or more bridge circuits are in electrical communication with the two or more strain gages, wherein outputs of the one or more bridge circuits are proportional to a strain detected by at least one of the two or more strain gages.

A flowmeter including a sensor assembly and a meter electronics is provided according to an embodiment. According to an embodiment, the flowmeter comprises one or more rigid flow tubes. The meter also comprises a driver coupled to the one or more rigid flow tubes and oriented to induce a strain in the one or more rigid flow tubes. The meter further comprises two or more strain gages coupled to the one or more rigid flow tubes, wherein the two or more strain gages are configured to output a signal proportional to a mass flow through the one or more rigid flow tubes. Additionally, a circuit is in electrical communication with the two or more strain gages, wherein the circuit cancels out common mode strain effects between the two or more strain gages, and wherein an out-of-phase strain on the two or more strain gages due to mass flow is amplified.

A method for determining flow through one or more rigid flow tubes in a flowmeter is provided according to an embodiment. According to an embodiment, the method comprises the steps of vibrating at least one of the one or more rigid flow tubes in a drive mode vibration. The method further comprises the steps of providing at least two strain gages and receiving strain sensor signals based on a vibrational response to the drive mode vibration from the at least two strain gages. The method also comprises the step of inputting at least two strain sensor signals into at least one bridge circuit, as well as the step of calculating a phase difference between strain sensor signals. According to an embodiment, the method further comprises the step of generating an output signal from the at least one bridge circuit and the step of determining a mass flow from the output signal.

A method for determining flow through one or more rigid flow tubes in a flowmeter, comprises the steps of: vibrating at least one of the one or more rigid flow tubes in a drive mode vibration; providing at least two strain gages; receiving strain sensor signals based on a vibrational response to the drive mode vibration from the at least two strain gages; inputting at least two strain sensor signals into a bridge circuit; generating an output signal from the bridge circuit, wherein the output signal comprises a change in voltage amplitude; and determining a mass flow from the output signal.

ASPECTS

According to an aspect, a flowmeter including a sensor assembly and a meter electronics comprises:
one or more rigid flow tubes;
a driver coupled to the one or more rigid flow tubes and oriented to induce a drive mode vibration in the one or more rigid flow tubes;
two or more strain gages coupled to the one or more rigid flow tubes and oriented to sense at least one of a tension and compression in the one or more rigid flow tubes;
one or more bridge circuits in electrical communication with the two or more strain gages, wherein outputs of the one or more bridge circuits are proportional to a strain detected by at least one of the two or more strain gages.

Preferably, the flowmeter comprises a high-pass filter with the meter electronics to eliminate a DC offset.

Preferably, the one or more bridge circuits electrically subtracts a vibrational response of a first of the two or more strain gages from a vibrational response of a second of the two or more strain gages to yield a voltage having an amplitude A, comprising $A=\sqrt{\alpha_1^2+\alpha_2^2\pm 2\alpha_1\alpha_2\cos(\Phi)}$, wherein:
$\alpha_1$ is a first amplitude of the first of the one or more bridge circuits at a drive frequency;
$\alpha_2$ is a second amplitude of the second of the one or more bridge circuits at the drive frequency; and
$\Phi$ is a phase difference between an output of the first of the one or more bridge circuits and the second of the one or more bridge circuits.

Preferably, a strain gage of the two or more strain gages is coupled to one of the one or more rigid flow tubes and is configured to detect a strain of the one or more rigid flow tubes approximately parallel with the longitudinal axis of the one of the one or more rigid flow tubes.

Preferably, a strain gage of the two or more strain gages is placed proximate a brace bar so that the strain gage of the two or more strain gages is subjected to approximately a maximum strain amplitude of the rigid flow tubes induced by the drive mode vibration.

Preferably, the strain gage of the two or more strain gages is coupled to one of the one or more rigid flow tubes between about 0% and 15% of a distance from the brace bar to a top of the flow tube measured from the brace bar along a vector perpendicular to a flow tube (130, 130') flow direction at the flow tube uppermost portion.

Preferably, the strain gage of the two or more strain gages is coupled to one of the one or more rigid flow tubes between about 6% and 9% of a distance from the brace bar to a top of the flow tube measured from the brace bar along a vector perpendicular to a flow tube flow direction at the flow tube uppermost portion.

Preferably, the one or more rigid flow tubes comprises at least one of a substantially "U" shape and substantially omega shape.

Preferably, the flowmeter comprises a filter component disposed between the one or more bridge circuits and meter electronics.

Preferably, the filter component comprises:
an amplifier;
a high-pass filter;
a low-pass filter; and
an analog to digital converter.

Preferably, a first strain gage of the two or more strain gages is coupled to a distal surface of an inlet leg of a first flow tube of the one or more rigid flow tubes, wherein the first strain gage is in electrical communication with a first position (R1) of a first bridge circuit of the one or more bridge circuits; a second strain gage of the two or more strain gages is coupled to a distal surface of an outlet leg of the first flow tube of the one or more rigid flow tubes, wherein the second strain gage is in electrical communication with a first position (R1') of a second bridge circuit of the one or more bridge circuits; and the first and second bridge circuits are in electrical communication with meter electronics.

Preferably, a first strain gage of the two or more strain gages is coupled to a distal surface of an inlet leg of a first flow tube of the one or more rigid flow tubes, wherein the first strain gage is in electrical communication with a first position (R1) of a first bridge circuit of the one or more bridge circuits; a second strain gage of the two or more strain gages is coupled to a distal surface of an outlet leg of the first flow tube of the one or more rigid flow tubes, wherein the second strain gage is in electrical communication with a first position (R1') of a second bridge circuit of the one or more bridge circuits; a third strain gage of the two or more strain gages is coupled to a distal surface of an inlet leg of a second flow tube of the one or more rigid flow tubes, wherein the third strain gage is in electrical communication with a third position (R3) of the first bridge circuit; a fourth strain gage of the two or more strain gages is coupled to a distal surface of an outlet leg of the second flow tube of the one or more rigid flow tubes, wherein the fourth strain gage is in electrical communication with a third position (R3') of the second bridge circuit; and the first and second bridge circuits are in electrical communication with meter electronics.

Preferably, a first strain gage of the two or more strain gages is coupled to a distal surface of an inlet leg of a first flow tube of the one or more rigid flow tubes, wherein the first strain gage is in electrical communication with a first position (R1) of a first bridge circuit of the one or more bridge circuits; a second strain gage of the two or more strain gages is coupled to a distal surface of an outlet leg of the first flow tube of the one or more rigid flow tubes, wherein the second strain gage is in electrical communication with a first position (R1') of a second bridge circuit of the one or more bridge circuits; a third strain gage of the two or more strain gages is coupled to a proximal surface of an inlet leg of a second flow tube of the one or more rigid flow tubes, wherein the third strain gage is in electrical communication with a fourth position (R4) of the first bridge circuit; a fourth strain gage of the two or more strain gages is coupled to a proximal surface of an outlet leg of the second flow tube of the one or more rigid flow tubes, wherein the fourth strain gage is in electrical communication with a fourth position (R4') of the second bridge circuit; and the first and second bridge circuits are in electrical communication with meter electronics.

Preferably, a first strain gage of the two or more strain gages is coupled to a distal surface of an inlet leg of a first flow tube of the one or more rigid flow tubes, wherein the first strain gage is in electrical communication with a first position (R1) of a first bridge circuit of the one or more bridge circuits; a second strain gage of the two or more strain gages is coupled to a distal surface of an outlet leg of the first flow tube of the one or more rigid flow tubes, wherein the second strain gage is in electrical communication with a first position (R1') of a second bridge circuit of the one or more bridge circuits; a third strain gage of the two or more strain gages is coupled to a proximal surface of an inlet leg of a second flow tube of the one or more rigid flow tubes, wherein the third strain gage is in electrical communication with a second position (R2) of the first bridge circuit; a fourth strain gage of the two or more strain gages is coupled to a proximal surface of an outlet leg of the second flow tube of the one or more rigid flow tubes, wherein the fourth strain gage is in electrical communication with a fourth position (R4') of the second bridge circuit; and the first and second bridge circuits are in electrical communication with meter electronics.

Preferably, a first strain gage of the two or more strain gages is coupled to a distal surface of an inlet leg of a first flow tube of the one or more rigid flow tubes, wherein the first strain gage is in electrical communication with a first position (R1) of a first bridge circuit of the one or more bridge circuits; a second strain gage of the two or more strain gages is coupled to a distal surface of an outlet leg of the first flow tube of the one or more rigid flow tubes, wherein the second strain gage is in electrical communication with a first position (R1') of a second bridge circuit of the one or more bridge circuits; a third strain gage of the two or more strain gages is coupled to a proximal surface of an inlet leg of a second flow tube of the one or more rigid flow tubes, wherein the third strain gage is in electrical communication with a fourth position (R4) of the first bridge circuit; a fourth strain gage of the two or more strain gages is coupled to a proximal surface of an outlet leg of the second flow tube of the one or more rigid flow tubes, wherein the fourth strain gage is in electrical communication with a second position (R2') of the second bridge circuit; and the first and second bridge circuits are in electrical communication with meter electronics.

Preferably, a first strain gage of the two or more strain gages is coupled to a distal surface of an inlet leg of a first flow tube of the one or more rigid flow tubes, wherein the first strain gage is in electrical communication with a first position (R1) of a first bridge circuit of the one or more bridge circuits; a second strain gage of the two or more strain gages is coupled to a distal surface of an outlet leg of the first flow tube of the one or more rigid flow tubes, wherein the second strain gage is in electrical communication with a first position (R1') of a second bridge circuit of the one or more bridge circuits; a third strain gage of the two or more strain gages is coupled to a proximal surface of an inlet leg of a second flow tube of the one or more rigid flow tubes, wherein the third strain gage is in electrical communication with a second position (R2) of the first bridge circuit; a fourth strain gage of the two or more strain gages is coupled to a proximal surface of an outlet leg of the second flow tube of the one or more rigid flow tubes, wherein the fourth strain gage is in electrical communication with a second position (R2') of the second bridge circuit; and the first and second bridge circuits are in electrical communication with meter electronics.

Preferably, a first strain gage of the two or more strain gages is coupled to a distal surface of an inlet leg of a first flow tube of the one or more rigid flow tubes, wherein the first strain gage is in electrical communication with a first position (R1) of a first bridge circuit of the one or more bridge circuits; a second strain gage of the two or more strain gages is coupled to a distal surface of an outlet leg of the first flow tube of the one or more rigid flow tubes, wherein the second strain gage is in electrical communication with a first position (R1') of a second bridge circuit of the one or more bridge circuits; a third strain gage of the two or more strain gages is coupled to a proximal surface of an inlet leg of a second flow tube of the one or more rigid flow tubes, wherein the third strain gage is in electrical communication with a third position (R3) of the first bridge circuit; a fourth strain gage of the two or more strain gages is coupled to a proximal surface of an outlet leg of the second flow tube of the one or more rigid flow tubes, wherein the fourth strain gage is in electrical communication with a third position (R3') of the second bridge circuit; a fifth strain gage of the two or more strain gages is coupled to a proximal surface of an inlet leg of the first flow tube of the one or more rigid flow tubes, wherein the fifth strain gage is in electrical communication with a second position (R2) of the first bridge circuit; a sixth strain gage of the two or more strain gages is coupled to a proximal surface of an outlet leg of the first flow tube of the one or more rigid flow tubes, wherein the sixth strain gage is in electrical communication with a second position (R2') of the second bridge circuit; a seventh strain gage of the two or more strain gages is coupled to a distal surface of an inlet leg of the second flow tube of the one or more rigid flow tubes, wherein the seventh strain gage is in electrical communication with a fourth position (R4) of the first bridge circuit; an eighth strain gage of the two or more strain gages is coupled to a distal surface of an outlet leg of the second flow tube of the one or more rigid flow tubes, wherein the eighth strain gage is in electrical communication with a fourth position (R4') of the second bridge circuit; and the first and second bridge circuits are in electrical communication with meter electronics.

Preferably, a first strain gage of the two or more strain gages is coupled to a distal surface of an inlet leg of a first flow tube of the one or more rigid flow tubes, wherein the first strain gage is in electrical communication with a first position (R1) of a first bridge circuit of the one or more bridge circuits; a second strain gage of the two or more strain gages is coupled to a distal surface of an outlet leg of the first flow tube of the one or more rigid flow tubes, wherein the second strain gage is in electrical communication with a second position (R2) of the first bridge circuit; and the first bridge circuit is in electrical communication with meter electronics.

Preferably, a first strain gage of the two or more strain gages is coupled to a distal surface of an inlet leg of a first flow tube of the one or more rigid flow tubes, wherein the first strain gage is in electrical communication with a second position (R2) of a first bridge circuit of the one or more bridge circuits; a second strain gage of the two or more strain gages is coupled to a distal surface of an outlet leg of the first flow tube of the one or more rigid flow tubes, wherein the second strain gage is in electrical communication with a first position (R1) of a the first bridge circuit; a third strain gage of the two or more strain gages is coupled to a distal surface of an inlet leg of a second flow tube of the one or more rigid flow tubes, wherein the third strain gage is in electrical communication with a third position (R3) of the first bridge circuit; a fourth strain gage of the two or more strain gages is coupled to a distal surface of an outlet leg of the second flow tube of the one or more rigid flow tubes, wherein the fourth strain gage is in electrical communication with a fourth position (R4) of the first bridge circuit; and the first and second bridge circuits are in electrical communication with meter electronics.

According to an aspect, a flowmeter including a sensor assembly and a meter electronics, comprises: one or more rigid flow tubes; a driver coupled to the one or more rigid flow tubes and oriented to induce a strain in the one or more rigid flow tubes; two or more strain gages coupled to the one or more rigid flow tubes, wherein the two or more strain gages are configured to output a signal whose amplitude is proportional to a mass flow through the one or more rigid flow tubes; a circuit in electrical communication with the two or more strain gages, wherein the circuit cancels out common mode strain effects between the two or more strain gages, wherein an out-of-phase strain on the two or more strain gages due to mass flow is amplified.

Preferably, the signal output from the two or more strain gages is a resistance having an amplitude proportional to the mass flow through the one or more rigid flow tubes.

Preferably, the circuit comprises one or more bridge circuits in electrical communication with the two or more strain gages, wherein an output of the one or more bridge circuits has an amplitude proportional to a strain detected by at least one of the two or more strain gages.

Preferably, the one or more bridge circuits outputs a voltage having an amplitude that is proportional to the strain detected by at least one of the two or more strain gages.

Preferably, the circuit further comprises: a high-pass filter to substantially block a DC component of the signal; an analog to digital converter; and an anti-aliasing filter to prevent signals with frequencies greater than the sampling rate of the analog to digital converter from being input into the analog to digital converter.

Preferably, the meter electronics further comprises a high-pass filter to eliminate a DC offset.

Preferably, the circuit electrically subtracts a vibrational response of a first of the two or more strain gages from a vibrational response of a second of the two or more strain gages to yield a voltage having an amplitude A, comprising $A=\sqrt{\alpha_1^2+\alpha_2^2\pm 2\alpha_1\alpha_2\cos(\Phi)}$, wherein:

$\alpha_1$ is a first amplitude of the first of the one or more bridge circuits at a drive frequency;

$\alpha_2$ is a second amplitude of the second of the one or more bridge circuits at the drive frequency; and $\Phi$ is a phase difference between an output of the first of the one or more bridge circuits and the second of the one or more bridge circuits.

According to an aspect, a method for determining flow through one or more rigid flow tubes in a flowmeter comprises the steps of:

vibrating at least one of the one or more rigid flow tubes in a drive mode vibration;

providing at least two strain gages;

receiving strain sensor signals based on a vibrational response to the drive mode vibration from the at least two strain gages;

inputting at least two strain sensor signals into at least one bridge circuit;

generating an output signal from the at least one bridge circuit; and determining a mass flow from the output signal.

Preferably, the method further comprises the step of filtering the output signal of the at least one bridge circuit with a high-pass filter to eliminate a DC offset.

Preferably, the method further comprises the steps of:
coupling one of the at least two strain gages to one of the one or more rigid flow tubes; and
detecting a strain of the one or more rigid flow tubes that is approximately parallel with the longitudinal axis of the one of the one or more rigid flow tubes.

Preferably, the method further comprises the step of calculating a phase difference between strain sensor signals.

Preferably, the step of coupling one of the at least two strain gages to one of the one or more rigid flow tubes comprises coupling the one of the at least two strain gages proximate a brace bar.

Preferably, the step of coupling the one of the at least two strain gages to one of the one or more rigid flow tubes comprises coupling the one of the at least two strain gages to the rigid flow tube between about 0% and 15% of a distance from the brace bar to a top of the flow tube measured from the brace bar along a vector perpendicular to a flow tube flow direction at the flow tube uppermost portion.

Preferably, the step of coupling the one of the at least two strain gages to one of the one or more rigid flow tubes comprises coupling the one of the at least two strain gages to the rigid flow tube is between about 6% and 9% of a distance from the brace bar to a top of the flow tube measured from the brace bar along a vector perpendicular to a flow tube flow direction at the flow tube uppermost portion.

Preferably, the one or more rigid flow tubes comprise at least one of a substantially "U" shape and substantially omega shape.

Preferably, the method further comprises the step of electrically subtracting a vibrational response of a first of the at least two strain gages from a vibrational response of a second of the at least two strain gages to yield a voltage having an amplitude A, comprising $A=\sqrt{\alpha_1^2+\alpha_2^2\pm 2\alpha_1\alpha_2\cos(\Phi)}$, wherein:

$\alpha_1$ is a first amplitude of the first of the one or more bridge circuits at a drive frequency;

$\alpha_2$ is a second amplitude of the second of the one or more bridge circuits at the drive frequency; and $\Phi$ is a phase difference between an output of the first of the one or more bridge circuits and the second of the one or more bridge circuits.

Preferably, the method further comprises the steps of:
amplifying the output signal to generate an amplified signal;
filtering the amplified signal with a high-pass filter;
filtering the amplified signal with a low-pass filter; and
converting the amplified signal to a digital signal.

Preferably, the method further comprises the steps of:
providing a first strain gage of the at least two strain gages;
coupling the first strain gage to a distal surface of an inlet leg of one of the one or more rigid flow tubes, wherein the first strain gage is in electrical communication with a first position of a first of the at least one bridge circuits; providing a first strain gage of the at least two strain gages;
providing a second strain gage of the at least two strain gages;
coupling the second strain gage to a distal surface of an outlet leg of one of the one or more rigid flow tubes, wherein the second strain gage is in electrical communication with a first position of a second of the at least one bridge circuit.

Preferably, the method further comprises the steps of:
providing a first strain gage of the at least two strain gages;
coupling the first strain gage to a distal surface of an inlet leg of one of the one or more rigid flow tubes, wherein the first strain gage is in electrical communication with a first position of a first of the at least one bridge circuit;
providing a first strain gage of the at least two strain gages;
providing a second strain gage of the at least two strain gages;
coupling the second strain gage to a proximal surface of an outlet leg of one of the one or more rigid flow tubes, wherein the second strain gage is in electrical communication with a first position of a second of the at least one bridge circuit.

Preferably, the method further comprises the steps of:
providing a first strain gage of the at least two strain gages;
coupling the first strain gage to a proximal surface of an inlet leg of one of the one or more rigid flow tubes, wherein the first strain gage is in electrical communication with a first position of a first of the at least one bridge circuit; providing a first strain gage of the at least two strain gages;
providing a second strain gage of the at least two strain gages;
coupling the second strain gage to a proximal surface of an outlet leg of one of the one or more rigid flow tubes, wherein the second strain gage is in electrical communication with a first position of a second of the at least one bridge circuit.

Preferably, the method further comprises the steps of:
providing a first strain gage of the two or more strain gages;
coupling the first strain gage to a distal surface of an inlet leg of a first flow tube of the one or more rigid flow tubes, wherein the first strain gage is in electrical communication with a first position of a first bridge circuit of the at least one bridge circuit;
providing a second strain gage of the two or more strain gages;
coupling the second strain gage to a distal surface of an outlet leg of the first flow tube of the one or more rigid flow tubes, wherein the second strain gage is in electrical communication with a first position of a second bridge circuit of the at least one bridge circuit;
providing a third strain gage of the two or more strain gages;
coupling the third strain gage to a distal surface of an inlet leg of a second flow tube of the one or more rigid flow tubes, wherein the third strain gage is in electrical communication with a third position of the first bridge circuit;
providing a fourth strain gage of the two or more strain gages; and coupling the fourth strain gage to a distal surface of an outlet leg of the second flow tube of the one or more rigid flow tubes, wherein the fourth strain gage is in electrical communication with a third position of the second bridge circuit.

Preferably, the method further comprises the steps of:

providing a first strain gage of the two or more strain gages;

coupling the first strain gage to a distal surface of an inlet leg of a first flow tube of the one or more rigid flow tubes, wherein the first strain gage is in electrical communication with a first position of a first bridge circuit of the at least one bridge circuit;

providing a second strain gage of the two or more strain gages;

coupling the second strain gage to a distal surface of an outlet leg of the first flow tube of the one or more rigid flow tubes, wherein the second strain gage is in electrical communication with a first position of a second bridge circuit of the at least one bridge circuit;

providing a third strain gage of the two or more strain gages;

coupling the third strain gage to a proximal surface of an inlet leg of a second flow tube of the one or more rigid flow tubes, wherein the third strain gage is in electrical communication with a fourth position of the first bridge circuit;

providing a fourth strain gage of the two or more strain gages; and coupling the fourth strain gage to a proximal surface of an outlet leg of the second flow tube of the one or more rigid flow tubes, wherein the fourth strain gage is in electrical communication with a fourth position of the second bridge circuit.

Preferably, the method further comprises the steps of:

providing a first strain gage of the two or more strain gages;

coupling the first strain gage to a distal surface of an inlet leg of a first flow tube of the one or more rigid flow tubes, wherein the first strain gage is in electrical communication with a first position of a first bridge circuit of the at least one bridge circuit;

providing a second strain gage of the two or more strain gages;

coupling the second strain gage to a distal surface of an outlet leg of the first flow tube of the one or more rigid flow tubes, wherein the second strain gage is in electrical communication with a first position of a second bridge circuit of the at least one bridge circuit;

providing a third strain gage of the two or more strain gages;

coupling the third strain gage to a proximal surface of an inlet leg of a second flow tube of the one or more rigid flow tubes, wherein the third strain gage is in electrical communication with a second position of the first bridge circuit;

providing a fourth strain gage of the two or more strain gages; and coupling the fourth strain gage to a proximal surface of an outlet leg of the second flow tube of the one or more rigid flow tubes, wherein the fourth strain gage is in electrical communication with a fourth position of the second bridge circuit.

Preferably, the method further comprises the steps of:

providing a first strain gage of the two or more strain gages;

coupling the first strain gage to a distal surface of an inlet leg of a first flow tube of the one or more rigid flow tubes, wherein the first strain gage is in electrical communication with a first position of a first bridge circuit of the at least one bridge circuit;

providing a second strain gage of the two or more strain gages;

coupling the second strain gage to a distal surface of an outlet leg of the first flow tube of the one or more rigid flow tubes, wherein the second strain gage is in electrical communication with a first position of a second bridge circuit of the at least one bridge circuit;

providing a third strain gage of the two or more strain gages;

coupling the third strain gage to a proximal surface of an inlet leg of a second flow tube of the one or more rigid flow tubes, wherein the third strain gage is in electrical communication with a fourth position of the first bridge circuit;

providing a fourth strain gage of the two or more strain gages; and coupling the fourth strain gage to a proximal surface of an outlet leg of the second flow tube of the one or more rigid flow tubes, wherein the fourth strain gage is in electrical communication with a second position of the second bridge circuit.

Preferably, the method further comprises the steps of:

providing a first strain gage of the two or more strain gages;

coupling the first strain gage to a distal surface of an inlet leg of a first flow tube of the one or more rigid flow tubes, wherein the first strain gage is in electrical communication with a first position of a first bridge circuit of the at least one bridge circuit;

providing a second strain gage of the two or more strain gages;

coupling the second strain gage to a distal surface of an outlet leg of the first flow tube of the one or more rigid flow tubes, wherein the second strain gage is in electrical communication with a first position of a second bridge circuit of the at least one bridge circuit;

providing a third strain gage of the two or more strain gages;

coupling the third strain gage to a proximal surface of an inlet leg of a second flow tube of the one or more rigid flow tubes, wherein the third strain gage is in electrical communication with a second position of the first bridge circuit;

providing a fourth strain gage of the two or more strain gages; and coupling the fourth strain gage to a proximal surface of an outlet leg of the second flow tube of the one or more rigid flow tubes, wherein the fourth strain gage is in electrical communication with a second position of the second bridge circuit.

Preferably, the method further comprises the steps of:

providing a first strain gage of the two or more strain gages;

coupling the first strain gage to a distal surface of an inlet leg of a first flow tube of the one or more rigid flow tubes, wherein the first strain gage is in electrical communication with a first position of a first bridge circuit of the at least one bridge circuit;

providing a second strain gage of the two or more strain gages;

coupling the second strain gage to a distal surface of an outlet leg of the first flow tube of the one or more rigid flow tubes, wherein the second strain gage is in electrical communication with a first position of a second bridge circuit of the at least one bridge circuit;
providing a third strain gage of the two or more strain gages;
coupling the third strain gage to a proximal surface of an inlet leg of a second flow tube of the one or more rigid flow tubes, wherein the third strain gage is in electrical communication with a third position of the first bridge circuit;
providing a fourth strain gage of the two or more strain gages;
coupling the fourth strain gage to a proximal surface of an outlet leg of the second flow tube of the one or more rigid flow tubes, wherein the fourth strain gage is in electrical communication with a third position of the second bridge circuit;
providing a fifth strain gage of the two or more strain gages;
coupling the fifth strain gage to a proximal surface of an inlet leg of the first flow tube of the one or more rigid flow tubes, wherein the fifth strain gage is in electrical communication with a second position of the first bridge circuit;
providing a sixth strain gage of the two or more strain gages;
coupling the sixth strain gage to a proximal surface of an outlet leg of the first flow tube of the one or more rigid flow tubes, wherein the sixth strain gage is in electrical communication with a second position of the second bridge circuit;
providing a seventh strain gage of the two or more strain gages;
coupling the seventh strain gage to a distal surface of an inlet leg of the second flow tube of the one or more rigid flow tubes, wherein the seventh strain gage is in electrical communication with a fourth position of the first bridge circuit;
providing an eighth strain gage of the two or more strain gages; and
coupling the eighth strain gage to a distal surface of an outlet leg of the second flow tube of the one or more rigid flow tubes, wherein the eighth strain gage is in electrical communication with a fourth position of the second bridge circuit.
Preferably, the method further comprises the steps of:
providing a first strain gage of the two or more strain gages;
coupling the first strain gage to a distal surface of an inlet leg of a first flow tube of the one or more rigid flow tubes, wherein the first strain gage is in electrical communication with a first position of a first bridge circuit of the one or more bridge circuits; and
providing a second strain gage of the two or more strain gages;
coupling the second strain gage to a distal surface of an outlet leg of the first flow tube of the one or more rigid flow tubes, wherein the second strain gage is in electrical communication with a second position of the first bridge circuit.
Preferably, the method further comprises the steps of:
providing a first strain gage of the two or more strain gages;
coupling the first strain gage to a distal surface of an inlet leg of a first flow tube of the one or more rigid flow tubes, wherein the first strain gage is in electrical communication with a first position of a first bridge circuit of the one or more bridge circuits;
providing a second strain gage of the two or more strain gages;
coupling the second strain gage to a distal surface of an outlet leg of the first flow tube of the one or more rigid flow tubes, wherein the second strain gage is in electrical communication with a first position of the first bridge circuit;
providing a third strain gage of the two or more strain gages;
coupling the third strain gage to a distal surface of an inlet leg of a second flow tube of the one or more rigid flow tubes, wherein the third strain gage is in electrical communication with a third position of the first bridge circuit;
providing a fourth strain gage of the two or more strain gages; and
coupling the fourth strain gage to a distal surface of an outlet leg of the second flow tube of the one or more rigid flow tubes, wherein the fourth strain gage is in electrical communication with a fourth position of the first bridge circuit.

According to an embodiment, a method for determining flow through one or more rigid flow tubes in a flowmeter comprises the steps of: vibrating at least one of the one or more rigid flow tubes in a drive mode vibration; providing at least two strain gages; receiving strain sensor signals based on a vibrational response to the drive mode vibration from the at least two strain gages; inputting at least two strain sensor signals into a bridge circuit; generating an output signal from the bridge circuit, wherein the output signal comprises a change in voltage amplitude; and determining a mass flow from the output signal.

Preferably, the method for determining flow through one or more rigid flow tubes in the flowmeter further comprising the steps of:
providing a first strain gage of the two or more strain gages;
coupling the first strain gage to a distal surface of an inlet leg of a first flow tube of the one or more rigid flow tubes, wherein the first strain gage is in electrical communication with a first position of the bridge circuit; and
providing a second strain gage of the two or more strain gages;
coupling the second strain gage to a distal surface of an outlet leg of the first flow tube of the one or more rigid flow tubes, wherein the second strain gage is in electrical communication with a second position of the bridge circuit.

Preferably, the method for determining flow through one or more rigid flow tubes in the flowmeter, further comprising the steps of:
providing a first strain gage of the two or more strain gages;
coupling the first strain gage to a distal surface of an inlet leg of a first flow tube of the one or more rigid flow tubes, wherein the first strain gage is in electrical communication with a second position of the bridge circuit;
providing a second strain gage of the two or more strain gages;
coupling the second strain gage to a distal surface of an outlet leg of the first flow tube of the one or more rigid flow tubes, wherein the second strain gage is in electrical communication with a first position of the bridge circuit;

providing a third strain gage of the two or more strain gages;

coupling the third strain gage to a distal surface of an inlet leg of a second flow tube of the one or more rigid flow tubes, wherein the third strain gage is in electrical communication with a third position of the bridge circuit;

providing a fourth strain gage of the two or more strain gages; and coupling the fourth strain gage to a distal surface of an outlet leg of the second flow tube of the one or more rigid flow tubes, wherein the fourth strain gage is in electrical communication with a fourth position of the bridge circuit.

BRIEF DESCRIPTION OF THE DRAWINGS

The same reference number represents the same element on all drawings. The drawings are not necessarily to scale.

DETAILED DESCRIPTION OF THE INVENTION

FIGS. 1-14 and the following description depict specific examples to teach those skilled in the art how to make and use the best mode of embodiments of a flowmeter and related methods. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
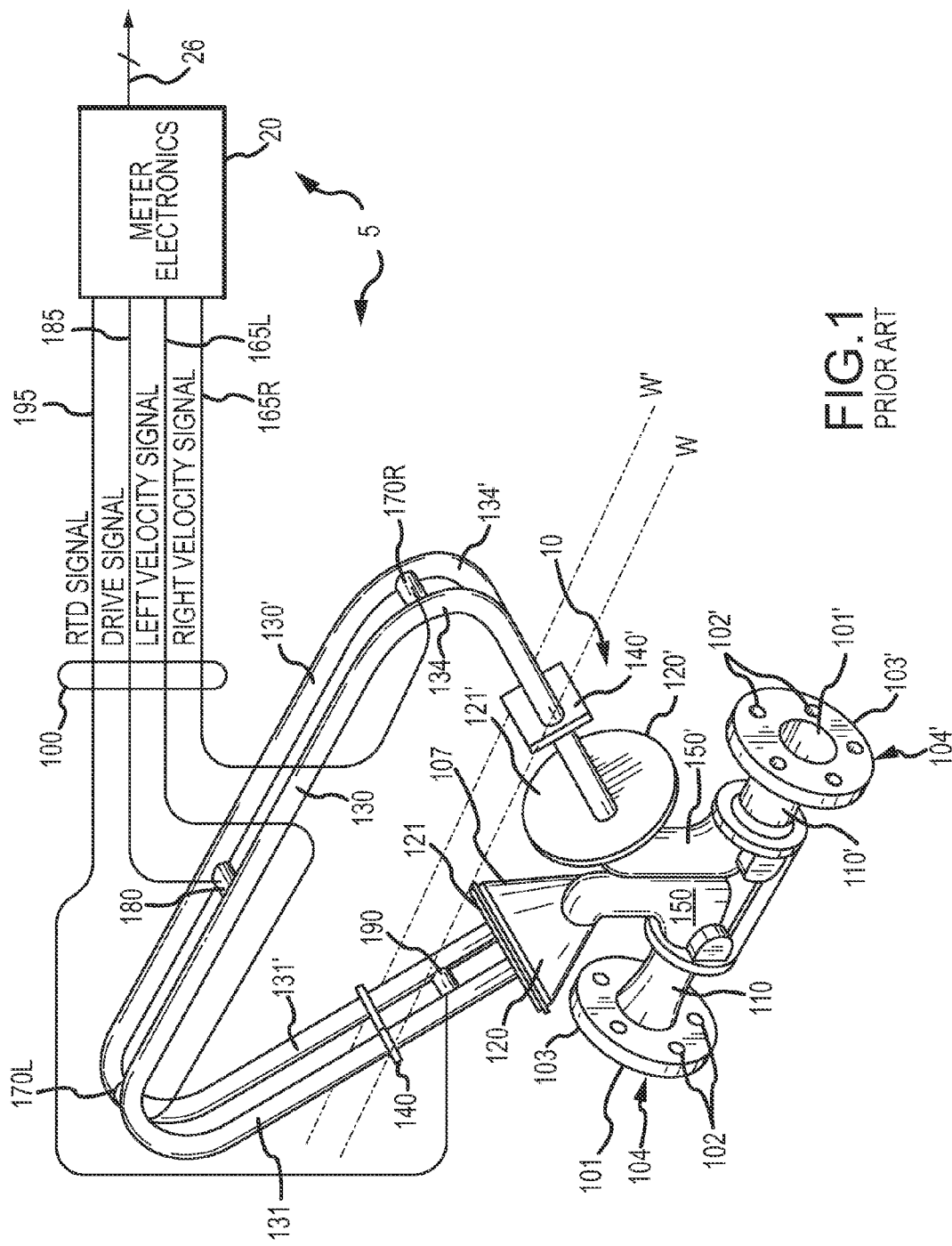
FIG. 1 illustrates a prior art flowmeter.

FIG. 1 illustrates a prior art flowmeter 5, which can be any vibrating meter, such as a Coriolis flowmeter. The flowmeter 5 comprises a sensor assembly 10 and meter electronics 20. The sensor assembly 10 responds to mass flow rate and density of a process material. Meter electronics 20 are connected to the sensor assembly 10 via leads 100 to provide density, mass flow rate, and temperature information over path 26, as well as other information not relevant to the present invention. Sensor assembly 10 includes a pair of manifolds 150 and 150', flanges 103 and 103' having flange necks 110 and 110', a pair of parallel flow tubes 130 (first flow tube) and 130' (second flow tube), driver mechanism 180, temperature sensor 190 such as a resistive temperature detector (RTD), and a pair of pickoffs 170L and 170R, such as magnet/coil pickoffs, strain gages, optical sensors, or any other pickoff sensor known in the art. The flow tubes 130 and 130' each have inlet legs 131 and 131' and outlet legs 134 and 134', which converge towards flow tube mounting blocks 120 and 120'. Flow tubes 130 and 130' bend at least one symmetrical location along their length and are essentially parallel throughout their length. Brace bars 140 and 140' serve to define the axis W and W' about which each flow tube oscillates.

The side legs 131, 131' and 134, 134' of flow tubes 130 and 130' are fixedly attached to flow tube mounting blocks 120 and 120' and these blocks, in turn, are fixedly attached to manifolds 150 and 150'. This provides a continuous closed material path through the sensor assembly 10.

When flanges 103 and 103', having holes 102 and 102' are connected, via inlet end 104 and outlet end 104' into a process line (not shown) which carries the process material that is being measured, material enters end 104 of the meter through an orifice 101 in flange 103 and is conducted through manifold 150 to flow tube mounting block 120 having a surface 121. Within manifold 150 the material is divided and routed through flow tubes 130 and 130'. Upon exiting flow tubes 130 and 130', the process material is recombined in a single stream within manifold 150' and is thereafter routed to exit end 104' connected by flange 103' having bolt holes 102' to the process line (not shown).

Flow tubes 130 and 130' are selected and appropriately mounted to the flow tube mounting blocks 120 and 120' so as to have substantially the same mass distribution, moments of inertia, and Young's modulus about bending axes W-W and W'-W', respectively. These bending axes go through brace bars 140 and 140'. Inasmuch as the Young's modulus of the flow tubes change with temperature, and this change affects the calculation of flow and density, temperature sensor 190 is mounted to flow tube 130', to continuously measure the temperature of the flow tube. The temperature of the flow tube and hence the voltage appearing across the temperature sensor 190 for a given current passing therethrough is governed by the temperature of the material passing through the flow tube. The temperature-dependent voltage appearing across the temperature sensor 190 is used in a well-known method by meter electronics 20 to compensate for the change in elastic modulus of flow tubes 130 and 130' due to any changes in flow tube temperature. The temperature sensor 190 is connected to meter electronics 20 by lead 195.

Both flow tubes 130 and 130' are driven by driver 180 in opposite directions about their respective bending axes W and W' at what is termed the first out-of-phase bending mode of the flowmeter. This driver 180 may comprise any one of many well-known arrangements, such as a magnet mounted to flow tube 130' and an opposing coil mounted to flow tube 130, through which an alternating current is passed for vibrating both flow tubes. A suitable drive signal is applied by meter electronics 20, via lead 185, to the driver 180.

Meter electronics 20 receive the temperature signal on lead 195, and the left and right velocity signals appearing on leads 165L and 165R, respectively. Meter electronics 20 produce the drive signal appearing on lead 185 to driver 180 and vibrate tubes 130 and 130'. Meter electronics 20 process the left and right velocity signals and the temperature signal to compute the mass flow rate and the density of the material passing through sensor assembly 10. This information, along with other information, is applied by meter electronics 20 over path 26 to utilization means.

Figure 2:
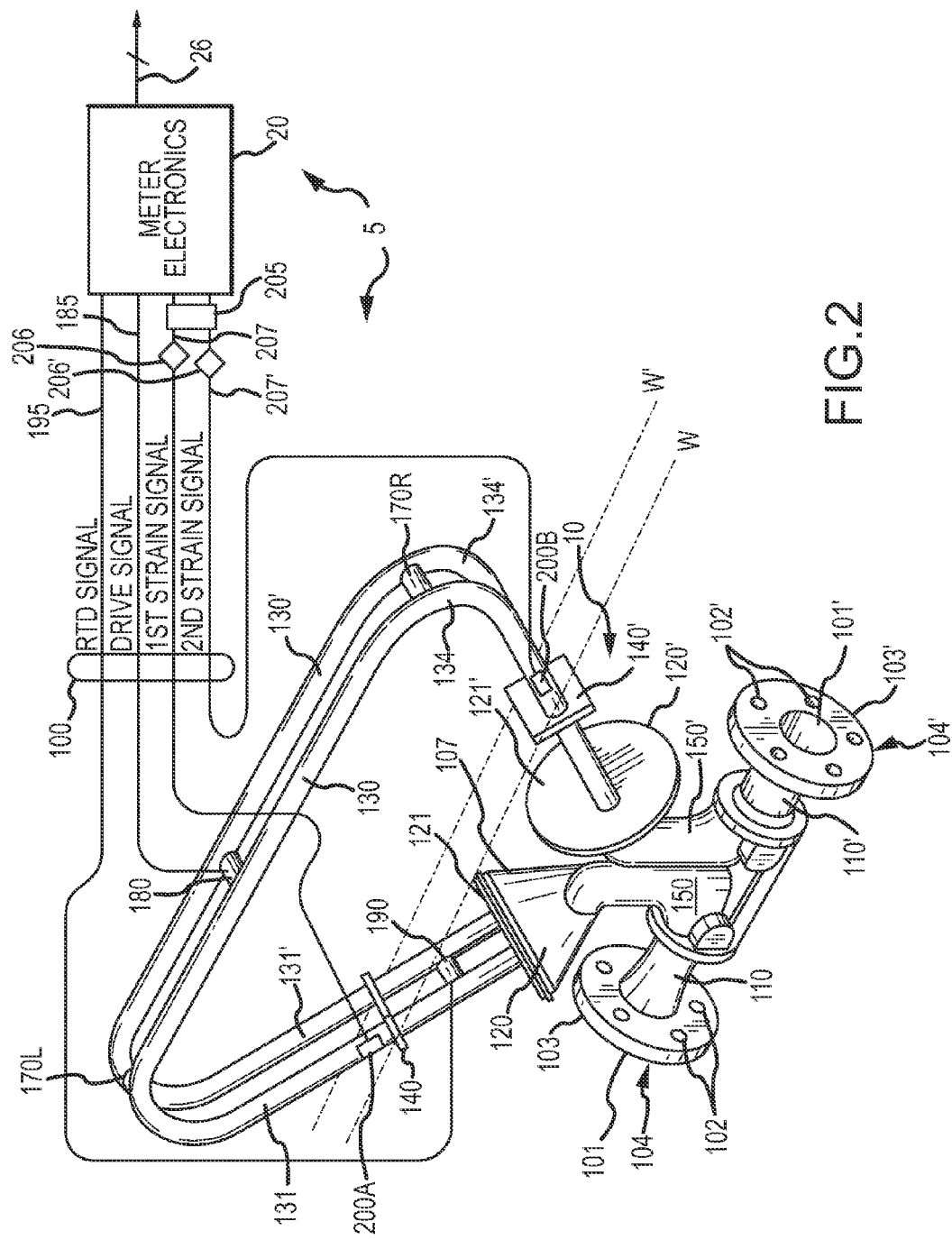
FIG. 2 illustrates an embodiment of a flowmeter.

Typically, Coriolis meters are driven at the first out-of-phase bend mode, with the flow-induced phase between inlet and outlet legs being sensed using coil/magnet pickoffs mounted on the inlet and outlet legs of the flowmeter. The meter itself and the methods for calculating flow described herein differ from traditional methods by which phase between two separate signals is calculated in the transmitter. In an embodiment, combined signals from one or more strain gages on the inlet side of a meter and the combined signals from one or more strain gages on the outlet side of the meter are input into the meter electronics. These signals are then treated like the current coil/magnet pickoffs, wherein a phase measurement is derived from the inlet and outlet signals. Wheatstone bridge circuits may be used in these embodiments for amplifying the signal. In an embodiment, fluid flow is indicated by the changing amplitude of the output of a bridge circuit connected to at least one strain gage—which is normally zero under a no flow condition (i.e. the drive mode is a normal mode with equal strain on the inlet and outlet legs). However, when flow is introduced, the drive mode becomes complex and there is phase delay between the motion of the inlet and outlet of the tube. This difference detected by strain gages is exploited using bridge circuits as described herein. In yet another embodiment, strain signals from the inlet and outlet portions of the flowmeter flow tubes are combined in a bridge circuit. In this case, there is only one signal input into the meter electronics whose amplitude is proportional to phase. FIG. 2 illustrates an embodiment of a flowmeter 5. A Coriolis flowmeter structure is described although it is apparent to those skilled in the art that the present invention could be practiced as a vibrating tube densitometer without the additional measurement capability provided by a Coriolis mass flowmeter. Common elements with the prior art device of FIG. 1 share the same reference numbers. The flow tubes 130 and 130' are driven by driver 180 in opposite directions about their respective bending axes W and W' and at what is termed the first out-of-phase bending mode of the flowmeter. This driver 180 may comprise any one of many well-known arrangements, such as a magnet mounted to flow tube 130' and an opposing coil mounted to flow tube 130 and through which an alternating current is passed for vibrating both flow tubes. It should be noted that the flow tubes 130, 130' are substantially rigid—made from a metal, for example—such that they are capable of only limited motion, such as, for example, the vibratory motion induced by a driver. A suitable drive signal is applied by meter electronics 20, via lead 185, to the driver 180. A first strain gage 200A is located on inlet leg 131 of the first flow tube 130 and a second strain gage 200B is located on the outlet leg 134 of the first flow tube 130. The primary difference between the pickoffs 170, 170R (FIG. 1) and the strain gages 200A, 200B is that coil/magnet pickoffs measure the velocity of the flow tubes and strain gages measure the strain of the flow tubes. It is preferable that each strain gage disclosed herein 200A-H be oriented to detect strain that is induced by a flow tube's 130, 130' drive mode motion. In an embodiment, the strain gages 200A-H are oriented substantially parallel to a longitudinal axis of the flow tube to which that strain gage is coupled.

For pickoffs 170L, 170R of the coil/magnet variety, the maximal velocity amplitude is proximate the driver 180, which is typically located in the center of the "U" of a flow tube 130, 130'. However, coil/magnet type pickoffs 170L, 170R are not placed in this location as this would place the pickoffs too close to the driver 180, so they are rather located at an area that provides suboptimal, yet resolvable, velocity amplitude to detect a phase signal differential. Maximum strain amplitude, however, is proximate the flow tube's 130, 130' brace bar 140, 140', and this is where the strain gages 200A, 200B are preferably located in the embodiments disclosed herein, however other strain gage locations are contemplated, as maximal phase differences are located elsewhere on the flow tubes 130, 130' or on the brace bars 140, 140'. In the above embodiment two strain gages are used, but additional strain gages are also contemplated, as will be described herein.

Figure 3:
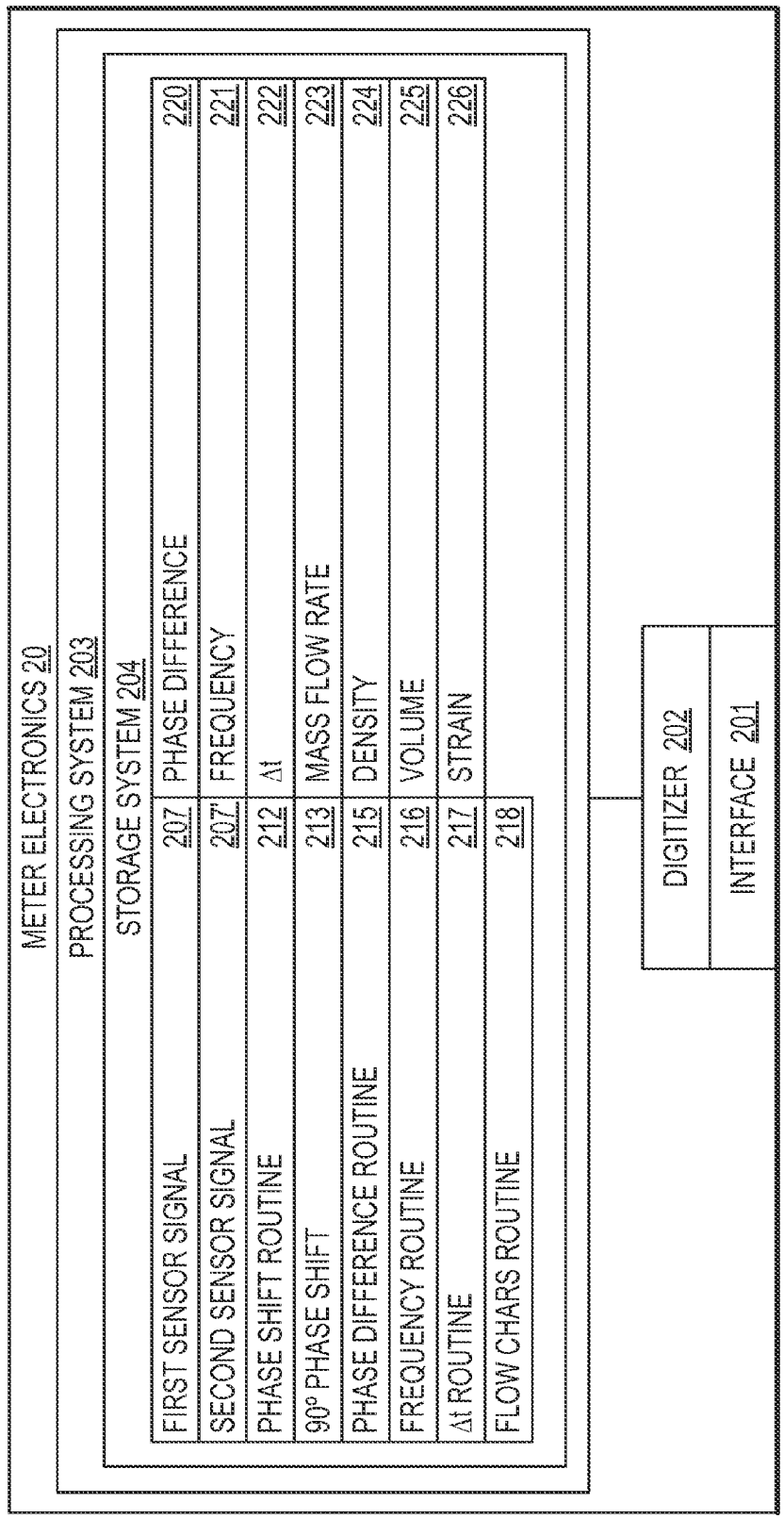
FIG. 3 is a diagram of meter electronics.

FIG. 3 illustrates meter electronics 20 of the flowmeter 5 according to an embodiment of the invention. The meter electronics 20 can include an interface 201 and a processing system 203. The meter electronics 20 receives first and second sensor signals from the sensor assembly 10, such as strain gage 200A, 200B signals, for example. The meter electronics 20 processes the first and second sensor signals in order to obtain flow characteristics of the flow material flowing through the sensor assembly 10. For example, the meter electronics 20 can determine one or more of a phase difference, a frequency, a time difference ($\Delta t$), a density, a mass flow rate, a strain, and a volume flow rate from the sensor signals, for example. In addition, other flow characteristics can be determined according to the invention.

The interface 201 receives the sensor signals from the strain gages 200A-H via the leads 100 illustrated in FIG. 2. The interface 201 can perform any necessary or desired signal conditioning, such as any manner of formatting, amplification, buffering, etc. Alternatively, some or all of the signal conditioning can be performed in the processing system 203.

In addition, the interface 201 can enable communications between the meter electronics 20 and external devices, such as through the communication path 26, for example. The interface 201 can be capable of any manner of electronic, optical, or wireless communication.

The interface 201 in one embodiment includes a digitizer (not shown), wherein the sensor signal comprises an analog sensor signal. The digitizer samples and digitizes the analog sensor signal and produces a digital sensor signal. The interface/digitizer can also perform any needed decimation, wherein the digital sensor signal is decimated in order to reduce the amount of signal processing needed and to reduce the processing time.

The processing system 203 conducts operations of the meter electronics 20 and processes flow measurements from the sensor assembly 10. The processing system 203 executes one or more processing routines and thereby processes the flow measurements in order to produce one or more flow characteristics.

The processing system 203 can comprise a general purpose computer, a microprocessing system, a logic circuit, or some other general purpose or customized processing device. The processing system 203 can be distributed among multiple processing devices. The processing system 203 can include any manner of integral or independent electronic storage medium, such as the storage system 204.

In the embodiment shown, the processing system 203 determines the flow characteristics from two or more vibrational/strain responses 220, 226. The processing system 203 can determine at least a magnitude, phase difference, time difference, and a frequency of the two or more responses 220, 226. In an embodiment, voltage from at least one bridge circuit 206, 206' such as a Wheatstone bridge circuit, in electrical communication with the strain gages 200A-H, is input into the meter electronics, as a first and second strain signal 207, 207'. In other embodiments, only a single bridge circuit 206 is present, and in other embodiments, at least two bridge circuits 206, 206' are present.

The storage system 204 can store flowmeter parameters and data, software routines, constant values, and variable values. In one embodiment, the storage system 204 includes routines that are executed by the processing system 203. In one embodiment, the storage system 204 stores a phase shift routine 212, a phase difference routine 215, a frequency routine 216, a time difference (Δt) routine 217, and a flow characteristics routine 218.

In one embodiment, the storage system 204 stores variables used to operate the flowmeter 5. The storage system 204 in one embodiment stores variables such as the two or more vibrational responses 220, 226 which are received from the strain gages 200A-H. In some embodiments, the storage system 204 stores one or more values generated by the meter electronics 20. In some embodiments, the storage system 204 stores one or more flow characteristics obtained from the flow measurements.

Embodiments sense flow by directly measuring the relative motion of the outlet 134, 134' (or inlet 131, 131') side of a flowtube 130, 130' with respect to the inlet 131, 131' (or outlet 134, 134') side of the same flowtube 130, 130'. Strain gages 200A-H connected to at least one bridge circuit 206, 206' are configured to produce a zero-amplitude signal during a no flow condition (which corresponds to a normal mode shape of the drive mode, i.e. no phase between inlet and outlet of the tubes). During flow, the same configuration will produce a sinusoid signal output whose amplitude is a function of flow rate (which corresponds to the mode shape gaining complexity, i.e. inlet/outlet phase, due to flow). In related embodiments, combined signals from one or more strain gages on the inlet side of a meter and the combined signals from one or more strain gages on the outlet side of the meter are input into the meter electronics. These signals are then treated like the current coil/magnet pickoffs, wherein a phase measurement is derived from the inlet and outlet signals. Bridge circuits may be used in these embodiments for amplifying the signal. In other embodiments, however, strain signals from the inlet and outlet portions of the flowmeter flow tubes are combined in a bridge circuit. In this case, there is only one signal input into the meter electronics whose amplitude is proportional to phase.

Referring to FIGS. 4-9 and 11-14, strain gages 200A-H are preferably located on inlet 131, 131' or outlet 134, 134' sides of a flow tube 130, 130' at a region proximate a brace bar 140, 140', as the greatest positive strain (tension) and highest negative strain (compression) occur at the junction between the flow tubes 130, 130' and respective brace bars 140, 140'. A preferred distance for a strain gage to be coupled to a flow tube is between approximately 0% and 15% of the straight-line distance between a brace bar 140, 140' and the top of a flow tube 130, 130' (measured along a vector perpendicular to the flowing tube direction at its uppermost portion). An even more preferred distance is between about 6% and 9%. However, these distances serve as examples, with other distances also contemplated to be within the scope of the description and claims. The strain gages 200A-H are preferably placed to sense vertical strain (i.e. strain parallel with the longitudinal axis of a flow tube 130, 130') on the flow tubes 130, 130'.

Figure 4:
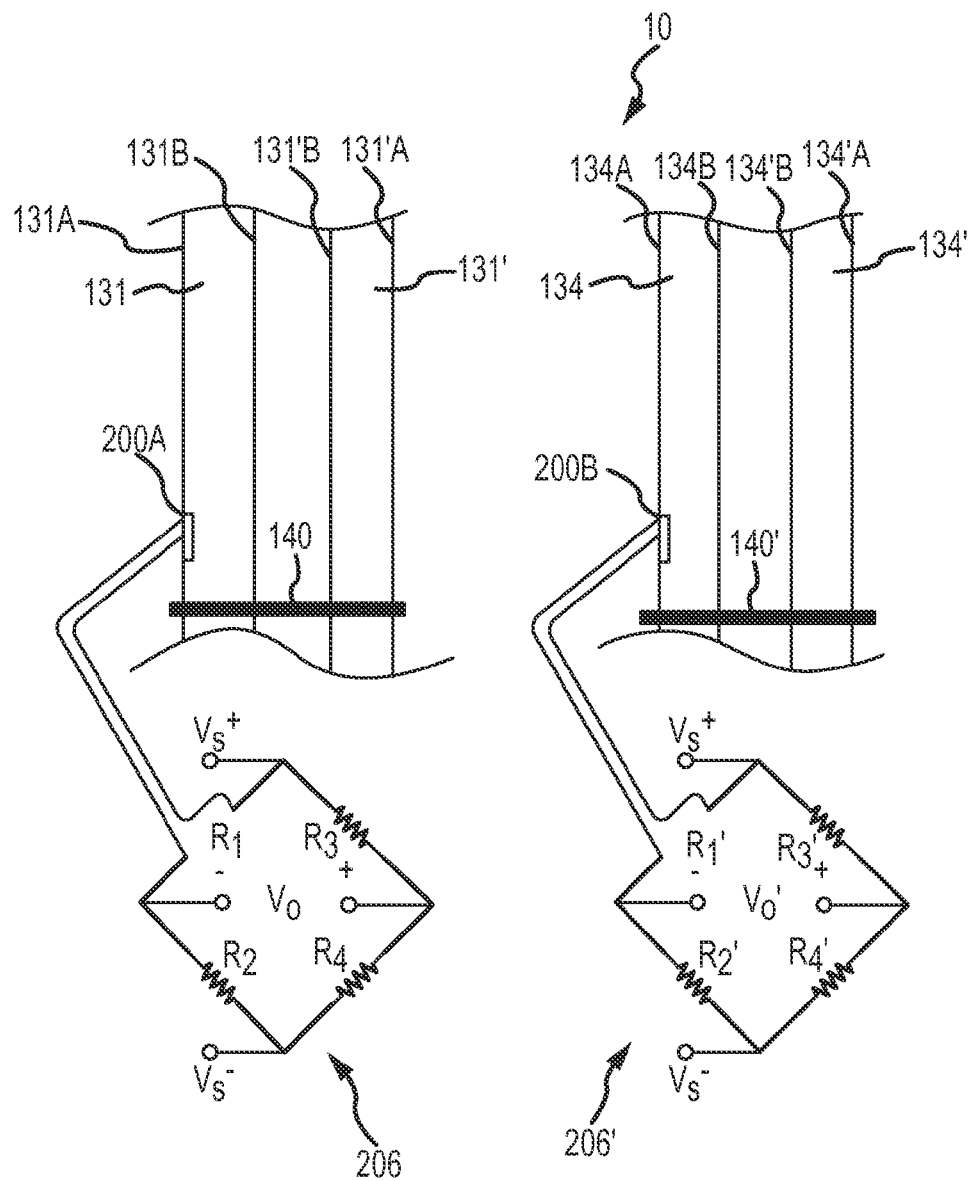
FIG. 4 illustrates an embodiment of a flowmeter wherein two strain gages are connected to two bridge circuits.

FIG. 4 illustrates an embodiment of a flowmeter 5 having two strain gages 200A, 200B in electrical communication with two bridge circuits 206, 206'. The bridge circuits 206, 206' convert small changes in resistance of the strain gage into relatively large changes in voltage. The bridge is comprised of a supply voltage, $V_s$, four resistors ($R_1$ through $R_4$), and an output voltage, $V_o$. The bridge is considered balanced, and the output voltage is 0 v when $R_1=R_2$ and $R_3=R_4$. A change in any of the resistors will unbalance the bridge and the output voltage will no longer be zero. The relationship between the supply voltage, resistances, and output voltage is shown in equation 1.

$$V_o = \left(\frac{R_3}{R_3 - R_4} - \frac{R_2}{R_1 - R_2}\right) * V_s \quad (1)$$

The resistor numbers correspond to the resistor locations shown in FIG. 4. Any or all of the resistors in the bridge circuit can be replaced by a strain gage. In this embodiment, two strain gages 200A, 200B are present on the same flowtube 130, one on the inlet leg 131 and one on the outlet leg 134 of the flowmeter 5, and having a bridge 206, 206' for each gage. Each gage 200A, 200B can be added to any location in the bridge circuit 206, 206', but is illustrated in FIG. 4 to occupy the first position $R_1$, $R_1'$ on each bridge circuit 206, 206'. It should be noted that remaining resistors $R_2$, $R_3$, $R_4$ and $R_2'$, $R_3'$, $R_4'$ are fixed value resistors. Additionally, for this embodiment, it is important that the strain gages 200A, 200B be located on the same relative surface of the flow tube 130. FIG. 4 illustrates the strain gage 200A oriented on the distal surface 131A of the inlet leg 131 while strain gage 200B is oriented on the distal surface 134A of the outlet leg 134.

The measurement made in FIG. 4 is taken from only one flow tube 130 of the two flow tubes 130, 130' of the flowmeter 5. This assumes that the flow going through both tubes 130, 130' is the same. Additional gages can be added to the other flow tube 130' to measure the strain of both flow tubes 130, 130', which increases the signal output of each bridge circuit 206, 206', and cancel certain common mode effects, as is further described below.

The effects of adding additional gages are best understood by manipulating equation 1 using the relationship of equation 2:

$$\frac{\Delta R}{R} = GF * \varepsilon \quad (2)$$

where ΔR is the change in the resistance of the strain gage, R is the unstrained resistance of the strain gage, GF is the gage factor of the gage, and ε is strain on the gage. The gage factor, GF, of a strain gage relates the strain on the gage to the gage's corresponding change in resistance. The strain gage is assigned a specific gage factor when calibrated during production. Using the above relationship, and assuming that ΔR is much smaller than R, equation 2 can be re-written as equation 3:

$$V_o = \frac{GF}{4}(\varepsilon_1 - \varepsilon_2 + \varepsilon_3 - \varepsilon_4) * V_s \qquad (3)$$

Figure 5:
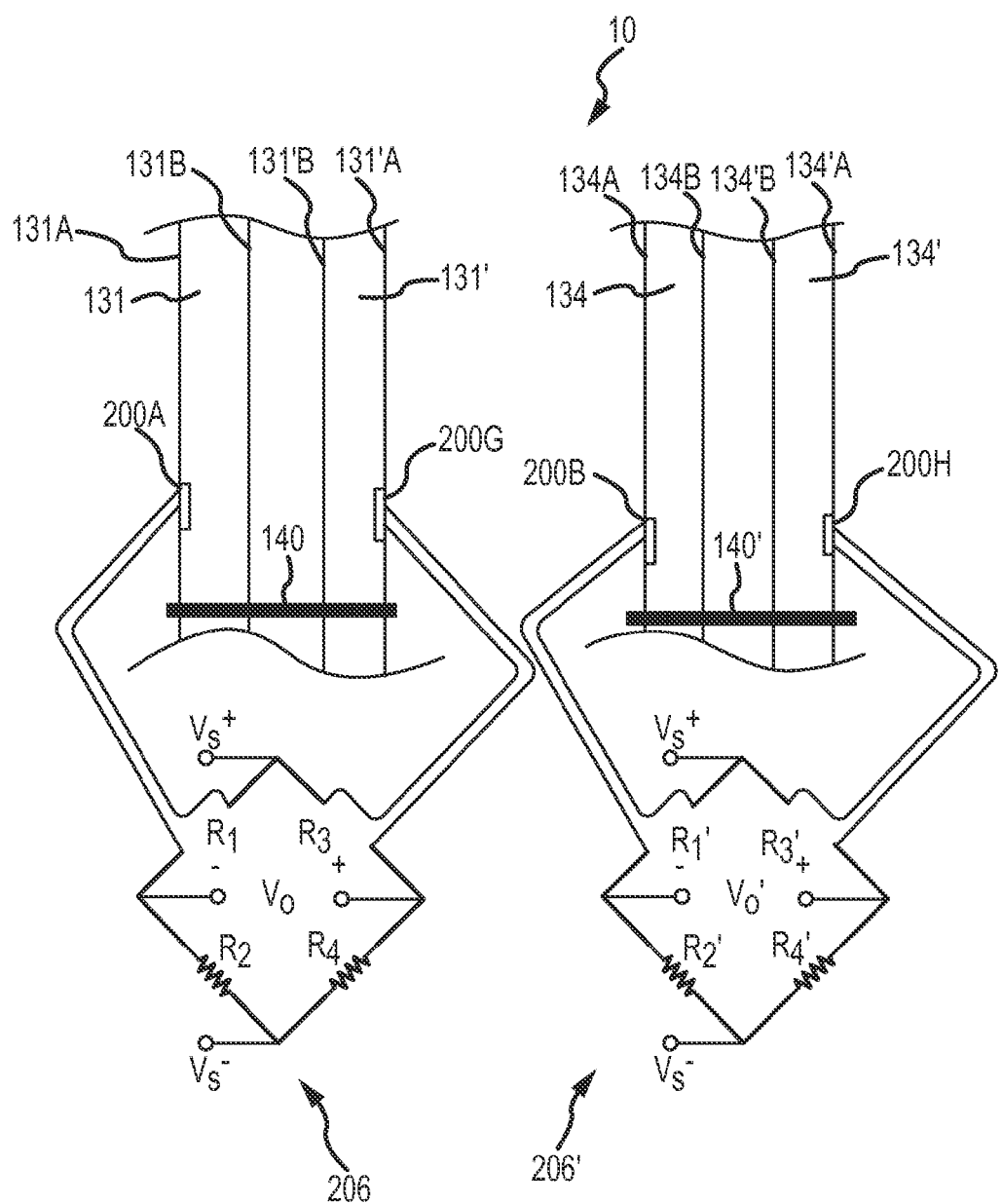
FIG. 5. illustrates an embodiment of a flowmeter wherein four strain gages are connected to two bridge circuits.

Turning to FIG. 5, in order to measure the average flow from both the first and second flow tubes 130, 130', an additional strain gage 200G is placed on the distal region of the inlet leg 131'A of the second flow tube 130' and an additional strain gage 200H is placed on the distal region of the outlet leg 134'A of the second flow tube 130'. The location of these additional gages 200G, 200H in the bridge circuits 206, 206' is at position R3 and R3', respectively.

If the signal from the additional strain gage 200G was added to position R2 or R4 in bridge circuit 206, and additional strain gage 200H was added to position R2 or R4 in bridge circuit 206', the strain values would cancel per equation 2, and the output voltage of the bridge would be zero. Instead, the additional gages 200G, 200H are connected to position R3, R3' in their respective bridge circuits 206, 206'. In this configuration the strain from the motion of the first and second flow tubes 130, 130' is added together, effectively doubling the output voltage of the bridge circuit 206, 206' as compared to the single gage-per-bridge embodiment illustrated in FIG. 4.

One limitation to the configuration illustrated in FIG. 4 is that any strain, in addition to that from the drive mode, which is in phase or common between the gages on the inlet or outlet sides, is also added. For example, should an imbalance between the thermal coefficient of expansion of the strain gage and the flow tube arise, any fluctuations in temperature will cause a common increase or decrease in strain between all of the gages. The effect of this common strain will be added from each gage in the bridge. In practice, such changes will cause a DC shift in the output signal of the bridge circuit. With the use of digital signal processing, a DC shift in the output signal of the bridge circuit will have no effect on the calculated phase and frequency. This is made possible through the use of a Hilbert filter, or any linear phase high-pass filter, in the digital signal processing. In the past, analog signal processing was used, and phase was calculated using zero crossings which could suffer large errors due to a DC shift. Even with the use of a Hilbert filter, DC voltage shifts can still be problematic at the analog to digital converter (A/D converter). An A/D converter has a voltage limitation. If the DC shift is large enough such that the voltage out of the bridge circuit exceeds the A/D voltage limits, the signal will be clipped and a loss of information is incurred. In one embodiment, an A/D converter with a greater voltage limit may be used; however, this will result in a decrease in resolution. In one embodiment, DC shift is canceled out with an analog high-pass filter. Analog high-pass filters can also be problematic due to the large phase shift that they add to a signal. If the phase effects of the analog high-pass filters that are used on the inlet and outlet signals are not identical, then there will be a resultant phase added between the inlet and outlet signals which shows up as a flow error.

Any common mode strain between the gages due to pressure or noise will also be enhanced with this configuration. These common mode strain effects are not necessarily low frequency and if they are near the drive frequency they can have negative effects on the flow measurement. In other embodiments, additional gages are mounted on the meter in such a way, as illustrated by FIGS. 6-9, that overcome the limitations of common mode effects between the gages, both low frequency (DC shift) and high frequency.

Figure 6:
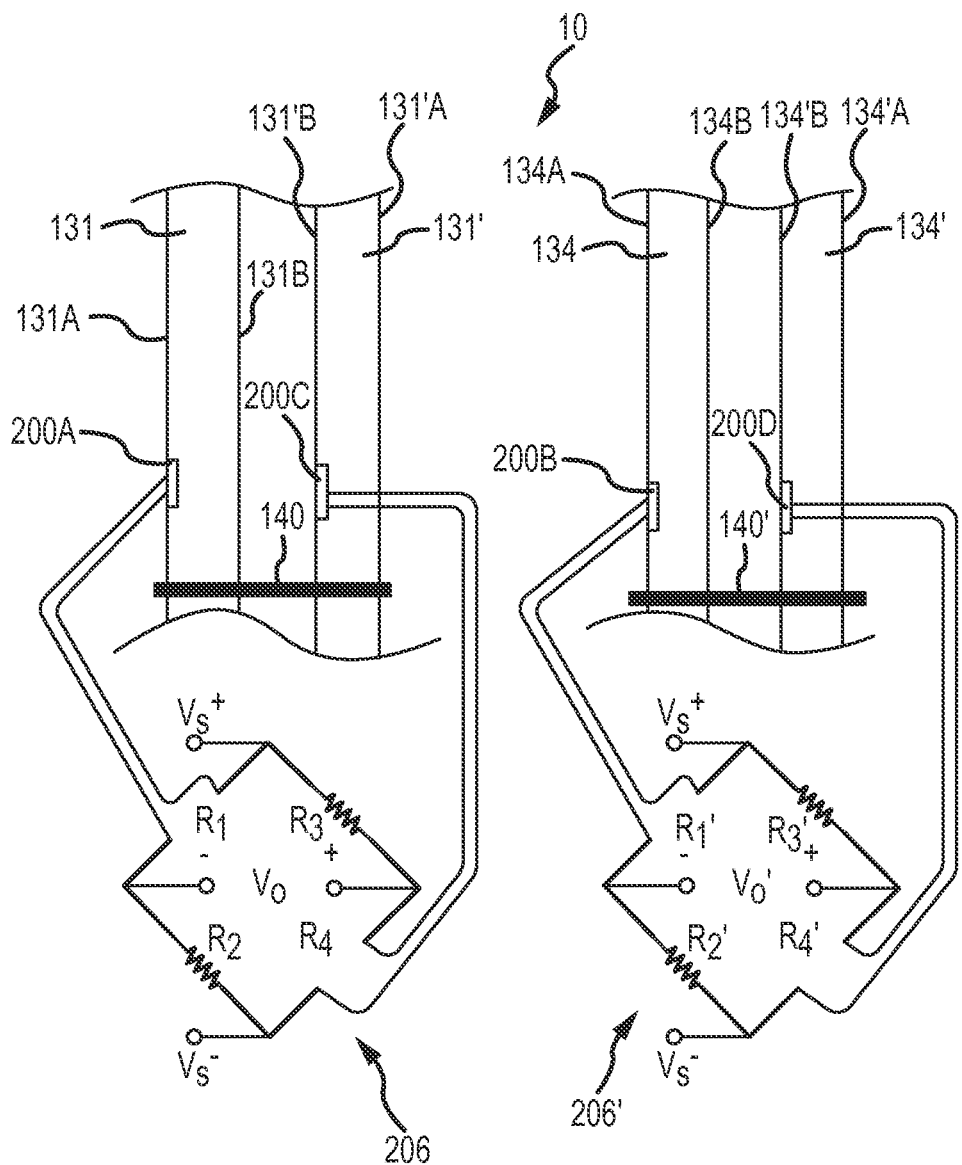
FIG. 6. illustrates another embodiment of a flowmeter wherein four strain gages are connected to two bridge circuits.
Figure 7:
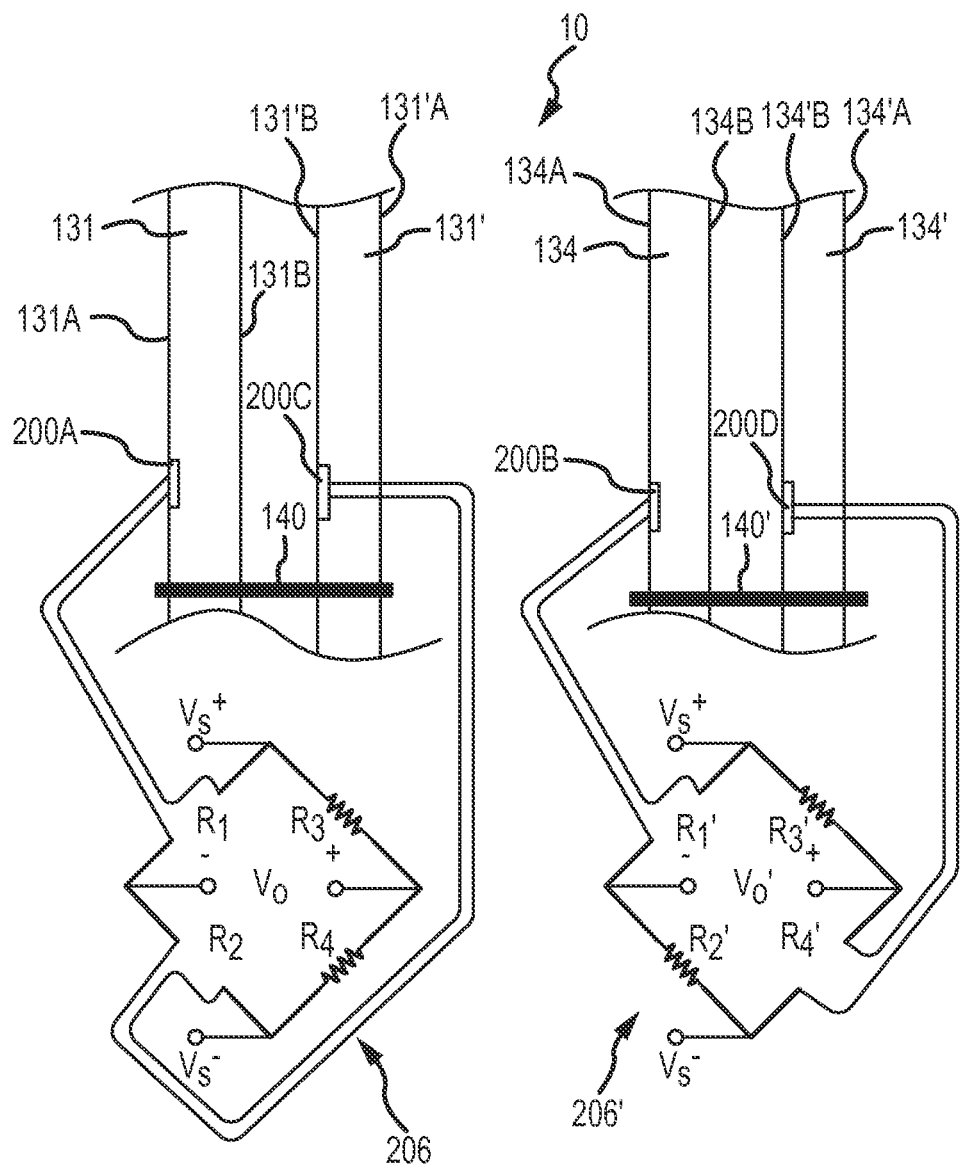
FIG. 7. illustrates yet another embodiment of a flowmeter wherein four strain gages are connected to two bridge circuits.
Figure 8:
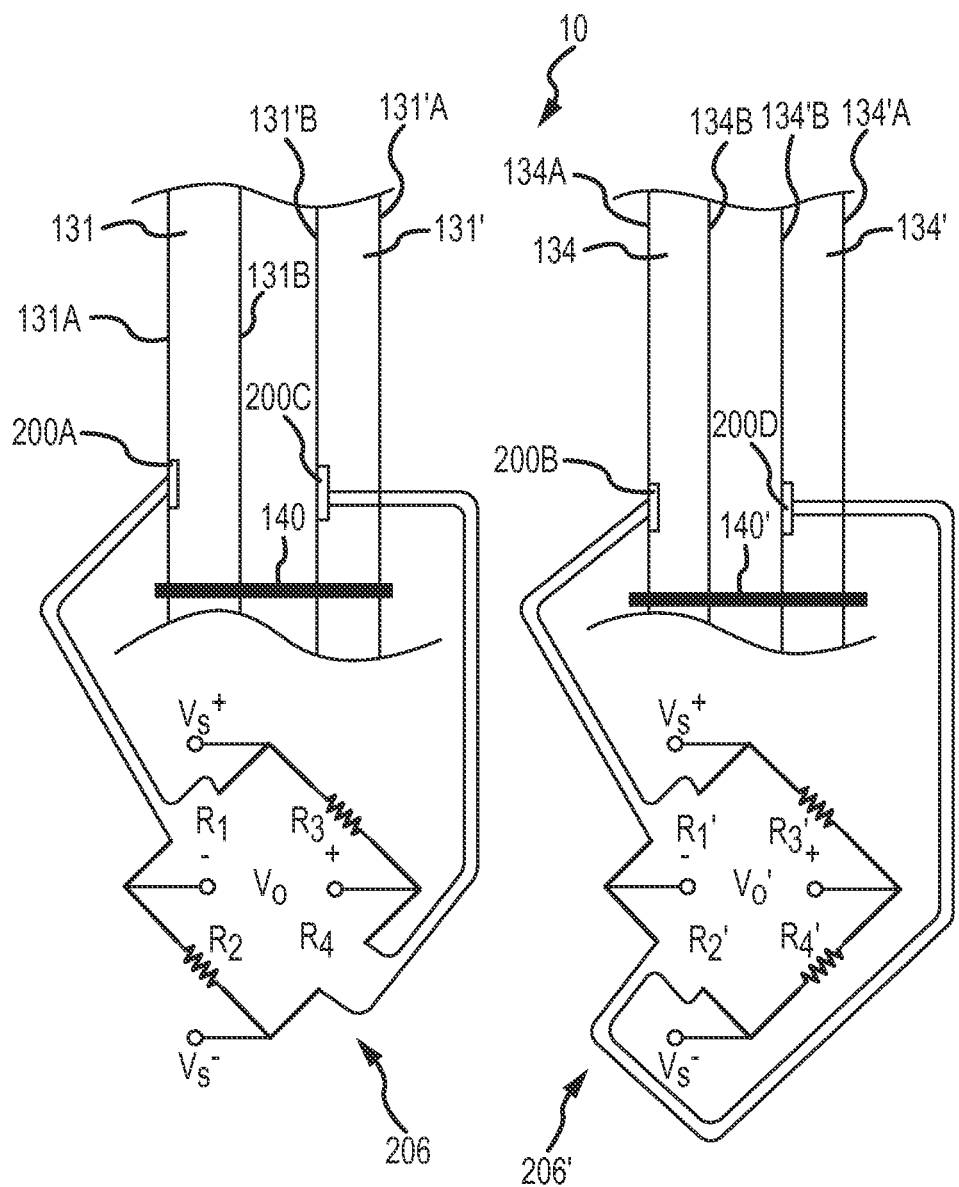
FIG. 8. illustrates yet another embodiment of a flowmeter wherein four strain gages are connected to two bridge circuits.
Figure 9:
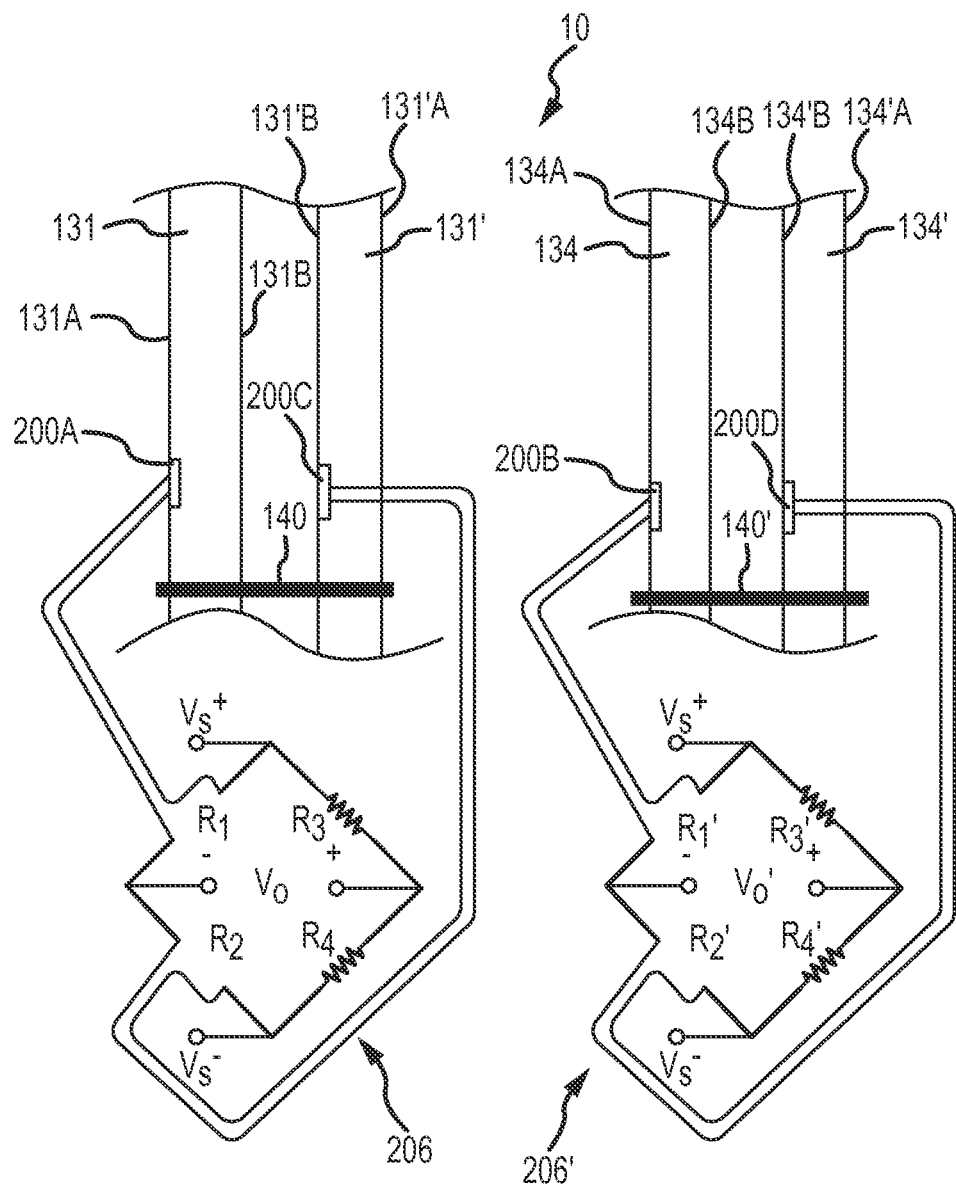
FIG. 9. illustrates yet another embodiment of a flowmeter wherein four strain gages are connected to two bridge circuits.

FIG. 6 illustrates two strain gages 200A, 200B present on the same flowtube 130, one per inlet leg 131 and outlet leg 134 of the flowmeter 5, having a bridge circuit 206, 206' for each gage 200A, 200B. The first gage 200A occupies the first position $R_1$, on the first bridge circuit 206. The second gage 200B occupies the first position $R_1'$ on the second bridge circuit 206'. Strain gages 200A and 200B are located on the distal surfaces 131A and 134A, respectively of the flow tube 130. Additional strain gages 200C and 200D are mounted on the proximal regions of the inlet leg 131' and outlet leg 134', respectively, of flow tube 130'. The strain between the gages 200A and 200C or between 200B and 200D, due to the drive motion of the flowmeter 5, is approximately 180° out of phase. When one gage of these gage pairs is in compression, the other gage is in tension. In this orientation the signal from the second gage 200C or 200D is input into either position $R_2$ or position $R_4$ of their respective bridge circuits 206, 206' in order to not cancel out the strain from each gage. In this orientation any in phase or common mode strain between the inlet gages 200A, 200C or outlet gages 200B, 200D will be canceled. Any out-of-phase strain on the gages, such as that due to the meter driving, will be added together. In particular, FIG. 6 illustrates the proximally positioned gages 200C, 200D in the $R_4$ and $R_4'$ positions of bridge circuit 206, 206', respectively. FIG. 7 illustrates an embodiment wherein the proximally positioned gage 200C is in the $R_2$ position of the first bridge circuit 206 and the proximally positioned gage 200D is in the $R_4'$ position of the second bridge circuit 206'. FIG. 8 illustrates an embodiment wherein the proximally positioned gage 200C is in the $R_4$ position of the first bridge circuit 206 and the proximally positioned gage 200D is in the $R_2'$ position of the second bridge circuit 206'. Lastly, FIG. 9 illustrates an embodiment wherein the proximally positioned gages 200C, 200D are in the $R_2$ and $R_2'$ positions of bridge circuits 206, 206', respectively.

Figure 10:
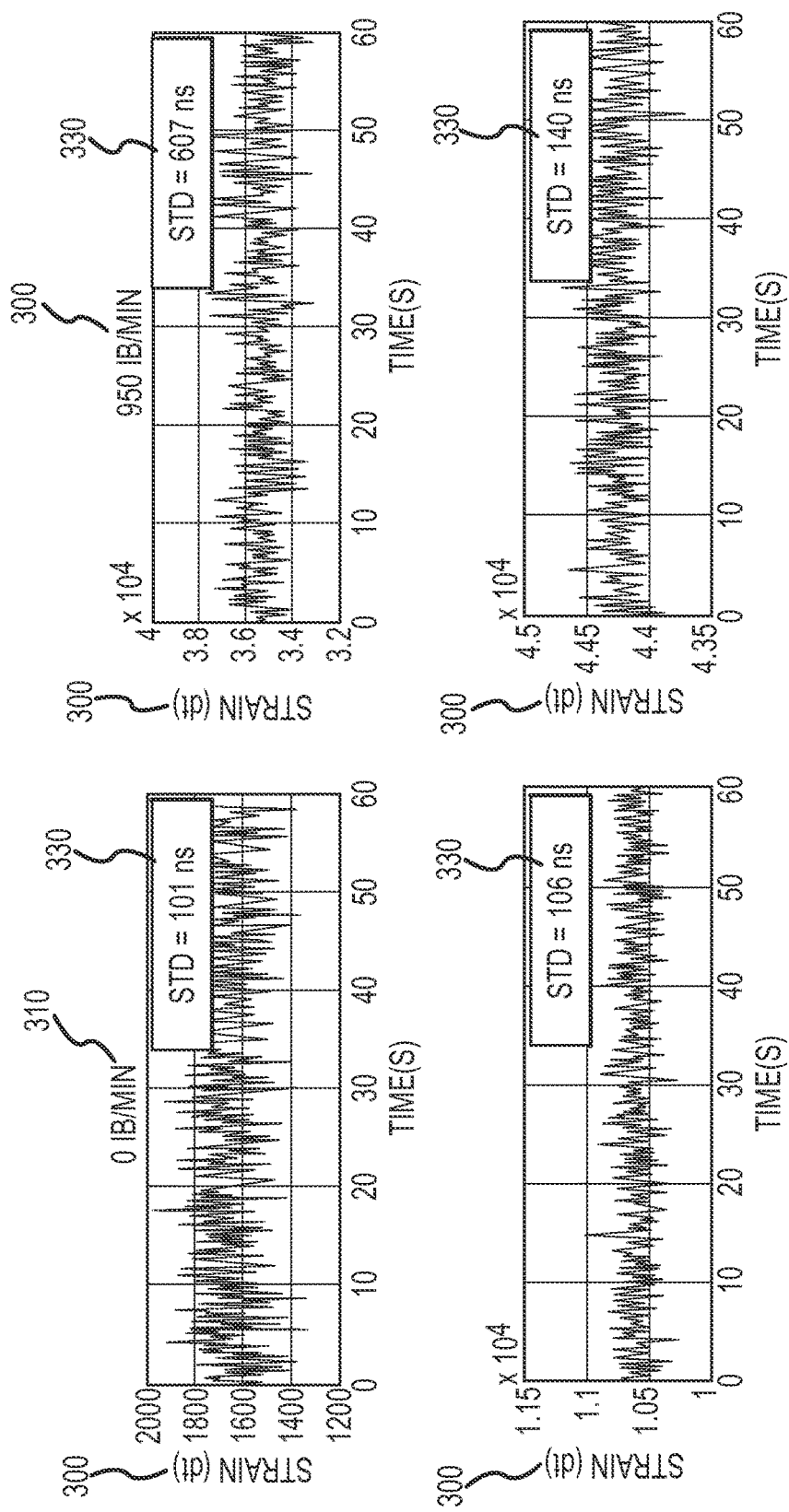
FIG. 10. illustrates data indicating the effect of the strain gage orientation.

FIG. 10 illustrates data indicating the effect of gage orientations that are representative of those shown in FIGS. 6-9. The phase difference between the strain gages of inlet and outlet legs of a single flow tube, labeled as strain (dt) 300, is measured from strain gage pickoffs over a one minute period. The graphs represent a test performed at either zero flow rate 310 or a flow rate of 950 pounds per minute 320. It should be noted that the phase of a zero flow condition is due to mechanical and electrical zeros. The standard deviation of the phase measurement is calculated for each flow rate. The standard deviation 330 of the phase measurement significantly increases with flow rate when the gages are mounted in an orientation to enhance common mode strain effects (see FIG. 10, top graphs), such as the configuration illustrated in FIG. 5. However, when the gages are mounted in an orientation to cancel common mode strain effects, such as the embodiments of FIGS. 6-9 having one gage on a distal portion of a first flow tube and one on a proximal portion of a second flow tube, the concomitant increase in standard deviation with flow rate is much smaller (see FIG. 10, bottom graphs).

Figure 11:
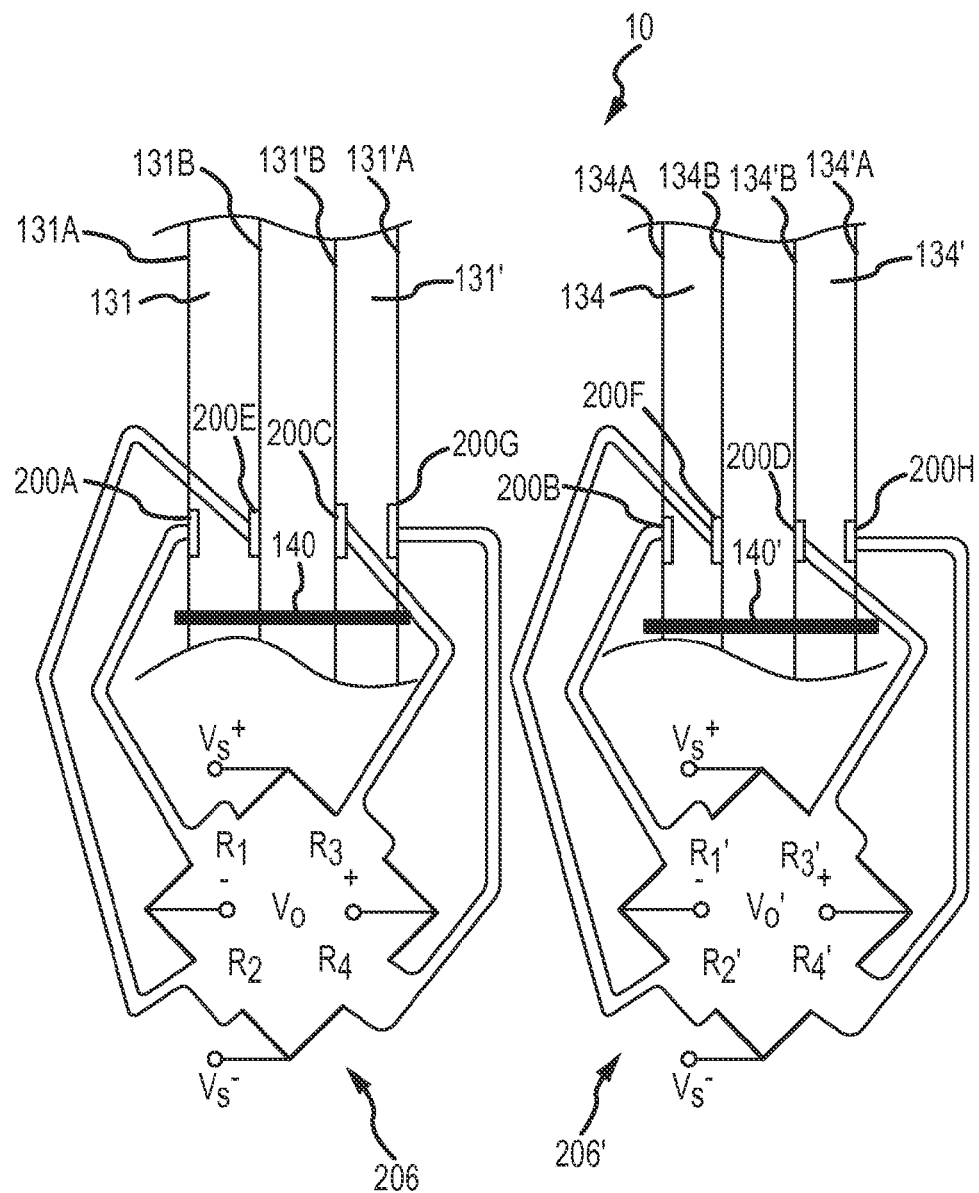
FIG. 11. illustrates an embodiment of a flowmeter wherein eight strain gages are connected to two bridge circuits.

Turning to FIG. 11, this illustrates an embodiment wherein four gages 200A, 200C, 200E, 200G are positioned on the inlet legs 131, 131' of the flowmeter 5, and four gages 200B, 200D, 200F, 200H are positioned on the outlet legs 134, 134' for a total of eight strain gages 200A-H connected to two bridge circuits 206, 206'. As illustrated in FIG. 11, the gage signals are oriented in each bridge such that they add, not subtract, the voltage output such that the amplitude of the bridge is four times that of a single gage (per side) embodiment. Because gages from both the distal and proximal regions of the tubes are combined together in each bridge circuit 206, 206', this embodiment exhibits the same common mode strain canceling effect with four gages per leg as with two gages per leg (when the two gages are mounted with one gage on the proximal region of a flow tube and one gage on the distal region of a flow tube).

Figure 12:
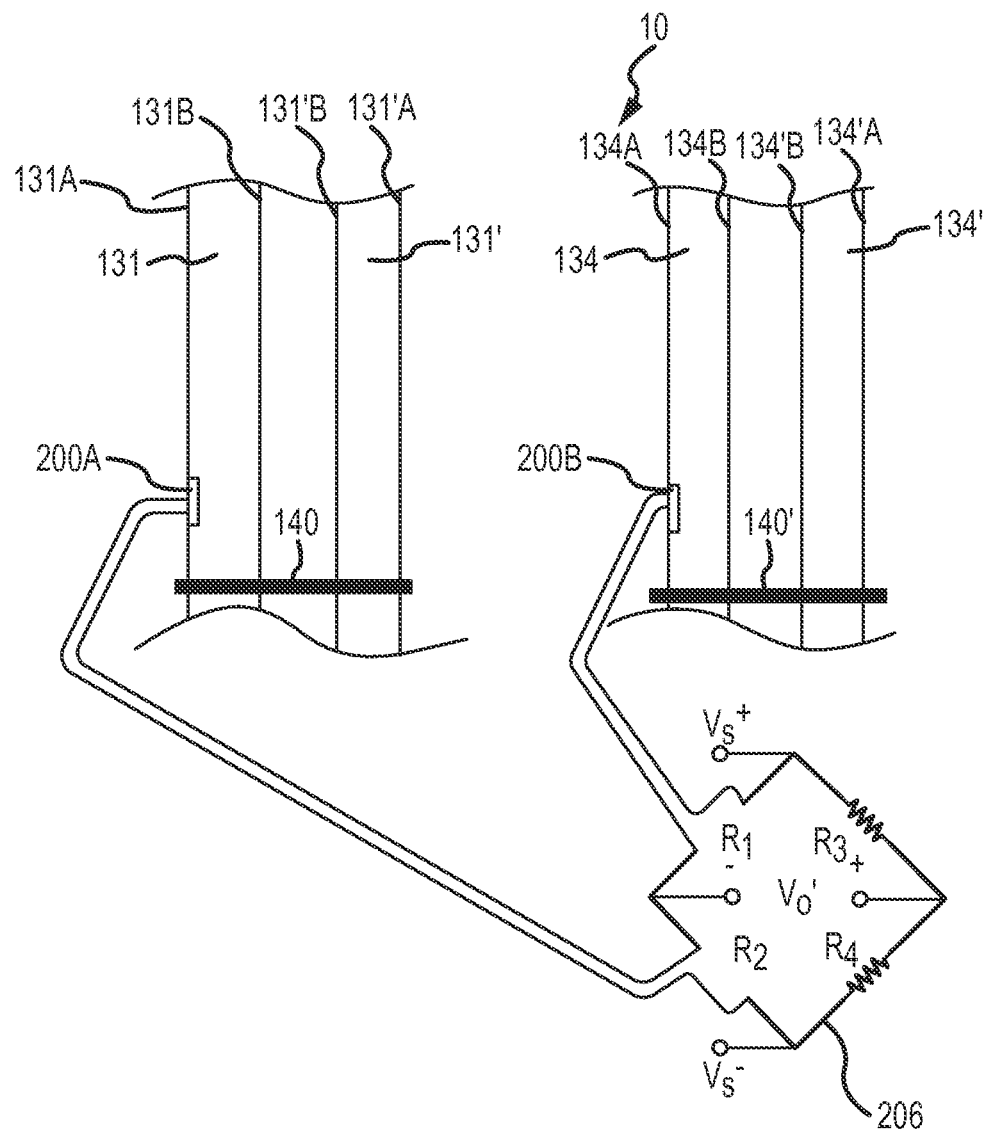
FIG. 12 illustrates an embodiment of a flowmeter wherein two strain gages are connected to a single bridge circuit.

Turning now to FIG. 12, in yet another embodiment, two strain gages 200A, 200B are attached to the inlet leg 131 of the first flowtube 130 and the outlet leg 134 of the first flowtube 130, respectively, and are connected to a single bridge circuit 206. When there is no flow through the flowmeter 5 and the flowmeter 5 is vibrating in the drive mode, the sinusoidal strain sensed by both strain gages 200A, 200B is theoretically in-phase and will cancel out for all time, resulting in a zero voltage output from the bridge. In practice, there may be some phase at no flow (commonly referred to as mechanical zero) resulting in a low amplitude sinusoid whose amplitude could be measured and removed as an offset. Once there is flow in the flowmeter 5, the outlet leg 134 will begin to lead the inlet leg 131, resulting in a time delay (phase shift) between the two strain measurements. The electrical subtraction of the two phase-shifted signals results in a sinusoidal output (at the drive frequency) whose amplitude is directly related to the phase shift. As flow increases, the phase shift increases and the amplitude of the voltage out of the bridge circuit 206 increases. Subtraction of the two sinusoids at the same frequency yields another sinusoid at that same frequency whose amplitude is a function of the individual amplitudes and the phase between the original signals, as described by equation 4:

$$\alpha_1 \sin(\omega t) \pm \alpha_2 \sin(\omega t + \Phi) = A \sin(\omega t + \Phi) \quad (4)$$

This subtraction is performed electrically through use of the bridge circuit 206, the result being a circuit output with amplitude A, according to equation 5:

$$A = \sqrt{\alpha_1^2 + \alpha_2^2 \pm 2\alpha_1 \alpha_2 \cos(\Phi)} \quad (5)$$

Figure 13:
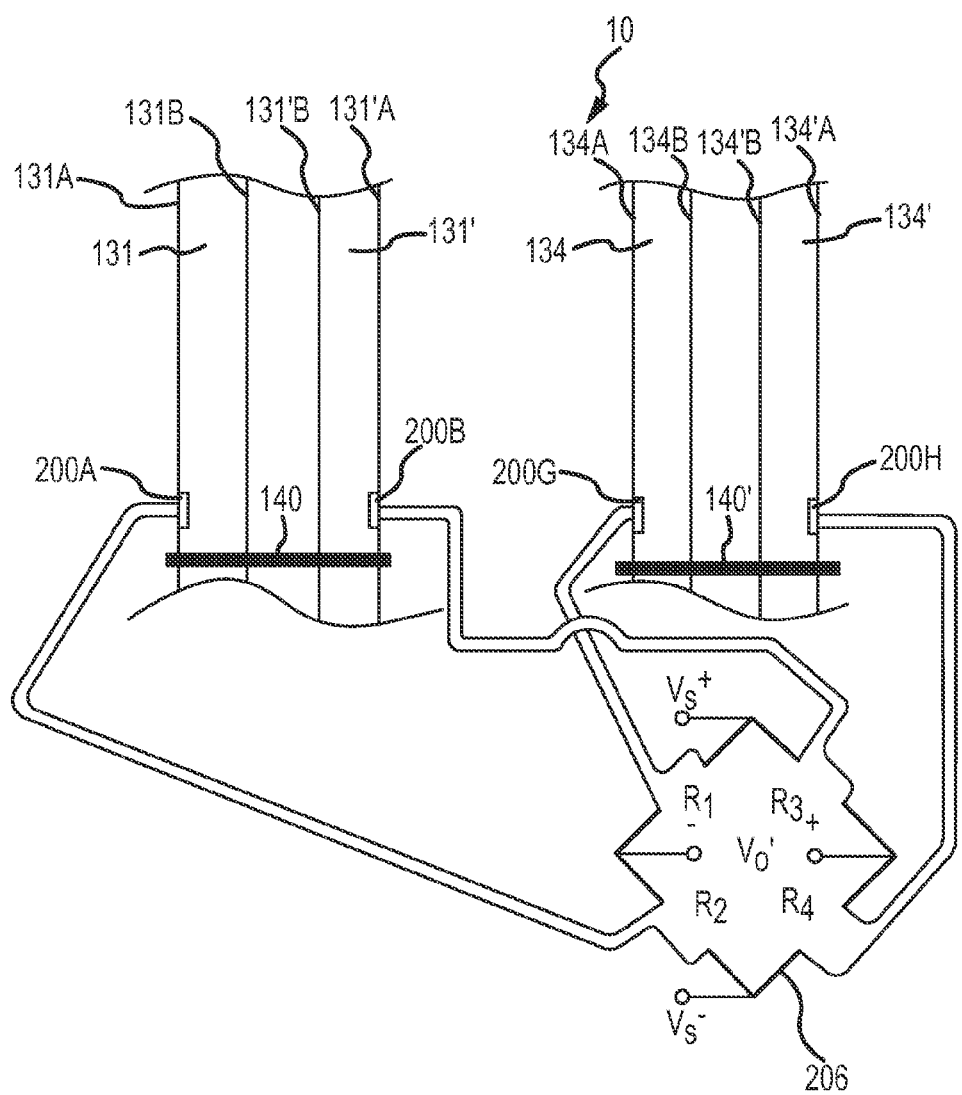
FIG. 13 illustrates an embodiment of a flowmeter wherein four strain gages are connected to a single bridge circuit.

With initial reference to FIG. 13, two additional strain gages 200G, 200H are added over the embodiment illustrated in FIG. 12. Two strain gages 200A, 200B are attached to the inlet leg 131 of the first flowtube 130 and the outlet leg 134 of the first flowtube 130, respectively, and are connected to a single bridge circuit 206, while two strain gages 200G, 200H are attached to the inlet leg 131' of the second flowtube 130' and the outlet leg 134' of the second flowtube 130', respectively, and are connected to the same single bridge circuit 206. In this configuration the strain from the motion of the first and second flow tubes 130, 130' is added together, effectively doubling the output voltage of the bridge circuit 206 as compared to the embodiment illustrated in FIG. 11. Equation 6 describes this configuration of strain gages 200A, 200B, 200G, 200H and bridge circuit 206:

$$V_{out} = \frac{V_s}{4} GF * (\Delta_{\epsilon_1} - \Delta_{\epsilon_2} + \Delta_{\epsilon_3} - \Delta_{\epsilon_4}) \quad (6)$$

There is a zero output under no-flow conditions, but the subtraction between $R_3$ and $R_4$ is substantially the same as the subtraction between $R_1$ and $R_2$, thus doubling the amplitude.

Figure 14:
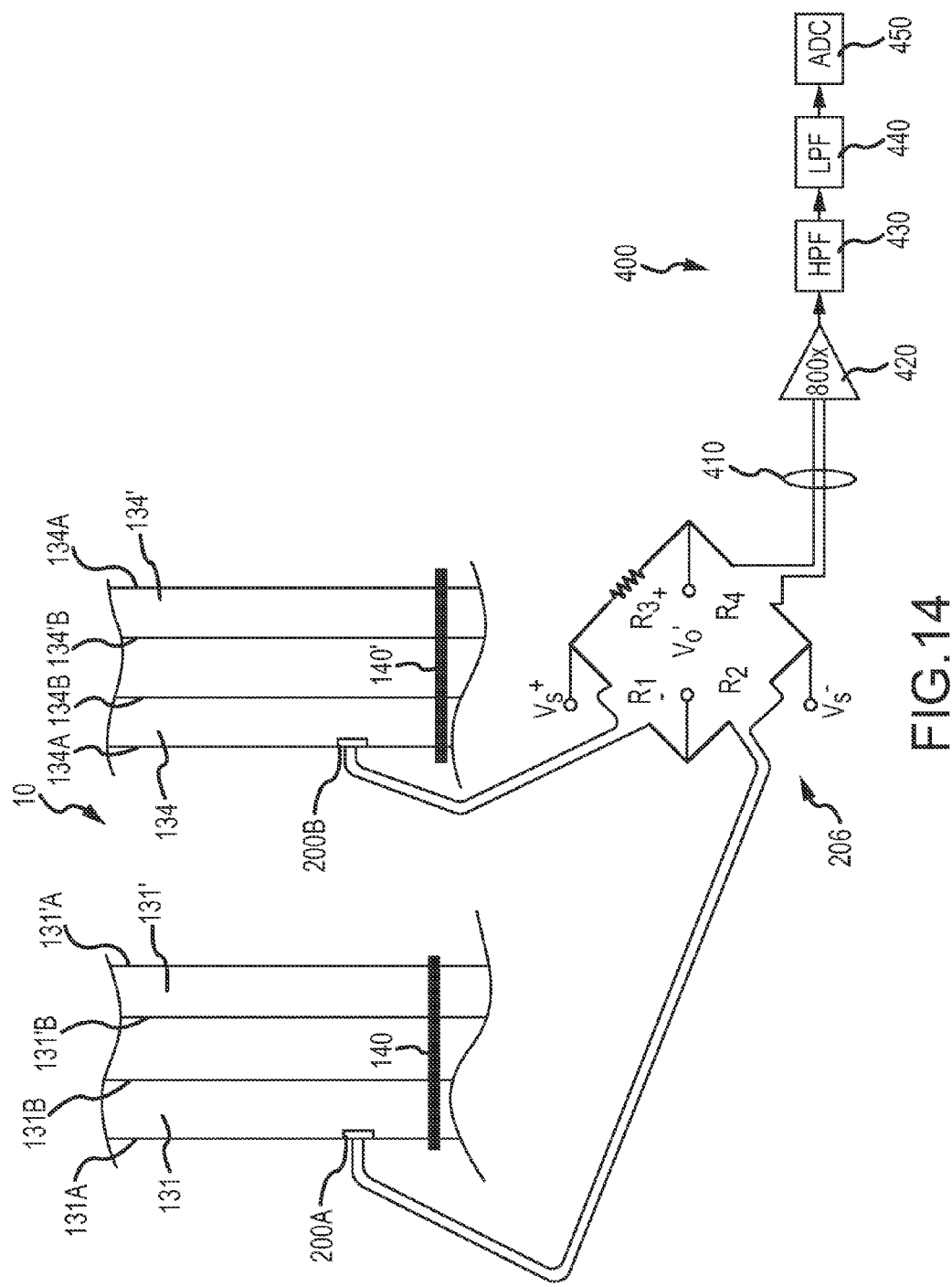
FIG. 14 illustrates an embodiment of a flowmeter wherein two strain gages are connected to a single bridge circuit having amplification components.

FIG. 14 illustrates the embodiment of FIG. 12 additionally comprising filter components 400 in addition to the bridge circuit 206. Though illustrated with two gages 200A, 200B and a single bridge circuit 206 as an example, the filter components 400 can be adapted for use with any number of strain gage and bridge circuit combinations, such as those in FIGS. 4-13 for example, without limitation, as will be apparent to one skilled in the art. Output 410 from the bridge circuit 206 is connected to an amplifier 420. In one embodiment, the amplifier 420 has a gain of approximately 800, but different gains are contemplated based on particular strain gages, differing flow calibration factors, different electronics, and other variables particular to a specific flowmeter 5. The amplifier 420 is AC coupled with a high-pass filter 430. In an embodiment, the high-pass filter 430 comprises a capacitor. This capacitive coupling substantially blocks the DC component of the signal. In a related embodiment, the output from the high-pass filter 430 is anti-aliased with a low-pass filter 440 to prevent signals with frequencies greater than a particular analog to digital converter's sampling rate from being seen by that analog to digital converter (ADC) 450. An ADC 450 may receive the signal from the low-pass filter 440, which is then sent to meter electronics 20.

For embodiments herein, the voltage output of a bridge circuit 206, 206' is input into the meter electronics 20. Because of DC drift that is inherent with strain gage measurement, the use of digital electronics is helpful in making accurate phase measurements between signals. With analog electronics, the phase between two sinusoidal signals, such as from the strain gages 200A-H, is typically calculated once a cycle when the signals from the gages 200A-H cross through zero volts. Because there is some DC drift with strain gages, the signals are not always centered at zero volts, making a steady phase calculation difficult. An embodiment utilizes a high-pass filter to continuously calculate phase between the two pickoff signals. With this approach, DC offset in the signal does not affect phase calculation. It should be noted, however, that it is permissible for voltage to exceed the limits of an analog-to-digital converter.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other devices and methods, and not just to the embodiments described above and shown in the accompanying figures. Accordingly, the scope of the invention should be determined from the following claims.

What is claimed is:

1. A flowmeter (5) including a sensor assembly (10) and a meter electronics (20), comprising:
   one or more rigid flow tubes (130, 130');

a drive mechanism (180) coupled to the one or more rigid flow tubes (130, 130') and oriented to induce a drive mode vibration in the one or more rigid flow tubes (130, 130');

two or more strain gages (200A-H) coupled to the one or more rigid flow tubes (130, 130') and oriented to sense at least one of a tension and compression in the one or more rigid flow tubes (130, 130');

one or more bridge circuits (206, 206') in electrical communication with the two or more strain gages (200A-H), wherein outputs of the one or more bridge circuits (206, 206') are proportional to a strain detected by at least one of the two or more strain gages (200A-H).

2. The flowmeter (5) of claim 1, further comprising a high-pass filter with the meter electronics (20) to eliminate a DC offset.

3. The flowmeter (5) of claim 1, wherein the one or more bridge circuits (206, 206')

electrically subtracts a vibrational response of a first of the two or more strain gages (200A-H) from a vibrational response of a second of the two or more strain gages (200A-H) to yield a voltage having an amplitude A, comprising $A=\sqrt{\alpha_1^2+\alpha_2^2 \pm 2\alpha_1\alpha_2\cos(\Phi)}$, wherein:

$\alpha_1$ is a first amplitude of the first of the one or more bridge circuits (206, 206') at a drive frequency;

$\alpha_2$ is a second amplitude of the second of the one or more bridge circuits (206, 206') at the drive frequency; and $\Phi$ is a phase difference between an output of the first of the one or more bridge circuits (206, 206') and the second of the one or more bridge circuits (206, 206').

4. The flowmeter (5) of claim 1, wherein a strain gage of the two or more strain gages (200A-H) is coupled to one of the one or more rigid flow tubes (130, 130') and is configured to detect a strain of the one or more rigid flow tubes (130, 130') approximately parallel with the longitudinal axis of the one of the one or more rigid flow tubes (130, 130').

5. The flowmeter (5) of claim 1, wherein a strain gage of the two or more strain gages (200A-H) is placed proximate a brace bar (140, 140') so that the strain gage of the two or more strain gages (200A-H) is subjected to approximately a maximum strain amplitude of the rigid flow tubes (130, 130') induced by the drive mode vibration.

6. The flowmeter (5) of claim 5, wherein the strain gage of the two or more strain gages (200A-H) is coupled to one of the one or more rigid flow tubes (130, 130') between about 0% and 15% of a distance from the brace bar (140, 140') to a top of the flow tube (130, 130') measured from the brace bar (140, 140'') along a vector perpendicular to a flow tube (130, 130') flow direction at the flow tube (130, 130') uppermost portion.

7. The flowmeter (5) of claim 5, wherein the strain gage of the two or more strain gages (200A-H) is coupled to one of the one or more rigid flow tubes (130, 130') between about 6% and 9% of a distance from the brace bar (140, 140') to a top of the flow tube (130, 130') measured from the brace bar (140, 140'') along a vector perpendicular to a flow tube (130, 130') flow direction at the flow tube (130, 130') uppermost portion.

8. The flowmeter (5) of claim 1, wherein the one or more rigid flow tubes (130, 130') comprises at least one of a substantially "U" shape and substantially omega shape.

9. The flowmeter (5) of claim 1, further comprising a filter component (400) disposed between the one or more bridge circuits (206, 206') and meter electronics (20).

10. The flowmeter (5) of claim 9, wherein the filter component comprises:
an amplifier (420);
a high-pass filter (430);
a low pass filter (440); and
an analog to digital converter (ADC) (450).

11. The flowmeter (5) of claim 1, wherein:
a first strain gage (200A) of the two or more strain gages (200A-H) is coupled to a distal surface (131A) of an inlet leg (131) of a first flow tube of the one or more rigid flow tubes (130, 130'), wherein the first strain gage (200A) is in electrical communication with a first position (R1) of a first bridge circuit (206) of the one or more bridge circuits (206, 206');

a second strain gage (200B) of the two or more strain gages (200A-H) is coupled to a distal surface (134A) of an outlet leg (134) of the first flow tube of the one or more rigid flow tubes (130, 130'), wherein the second strain gage (200B) is in electrical communication with a first position (R1') of a second bridge circuit (206') of the one or more bridge circuits (206, 206'); and the first and second bridge circuits (206, 206') are in electrical communication with meter electronics (20).

12. The flowmeter (5) of claim 1, wherein:
a first strain gage (200A) of the two or more strain gages (200A-H) is coupled to a distal surface (131A) of an inlet leg (131) of a first flow tube of the one or more rigid flow tubes (130, 130'), wherein the first strain gage (200A) is in electrical communication with a first position (R1) of a first bridge circuit (206) of the one or more bridge circuits (206, 206');

a second strain gage (200B) of the two or more strain gages (200A-H) is coupled to a distal surface (134A) of an outlet leg (134) of the first flow tube of the one or more rigid flow tubes (130, 130'), wherein the second strain gage (200B) is in electrical communication with a first position (R1') of a second bridge circuit (206') of the one or more bridge circuits (206, 206');

a third strain gage (200G) of the two or more strain gages (200A-H) is coupled to a distal surface (131'A) of an inlet leg (131') of a second flow tube of the one or more rigid flow tubes (130, 130'), wherein the third strain gage (200G) is in electrical communication with a third position (R3) of the first bridge circuit (206);

a fourth strain gage (200H) of the two or more strain gages (200A-H) is coupled to a distal surface (134'A) of an outlet leg (134') of the second flow tube of the one or more rigid flow tubes (130, 130'), wherein the fourth strain gage (200H) is in electrical communication with a third position (R3') of the second bridge circuit (206'); and the first and second bridge circuits (206, 206') are in electrical communication with meter electronics (20).

13. The flowmeter (5) of claim 1, wherein:
a first strain gage (200A) of the two or more strain gages (200A-H) is coupled to a distal surface (131A) of an inlet leg (131) of a first flow tube of the one or more rigid flow tubes (130, 130'), wherein the first strain gage (200A) is in electrical communication with a first position (R1) of a first bridge circuit (206) of the one or more bridge circuits (206, 206');

a second strain gage (200B) of the two or more strain gages (200A-H) is coupled to a distal surface (134A) of an outlet leg (134) of the first flow tube of the one or more rigid flow tubes (130, 130'), wherein the second strain gage (200B) is in electrical communication with a first position (R1') of a second bridge circuit (206') of the one or more bridge circuits (206, 206');
a third strain gage (200C) of the two or more strain gages (200A-H) is coupled to a proximal surface (131'B) of an inlet leg (131') of a second flow tube of the one or more rigid flow tubes (130, 130'), wherein the third strain gage (200C) is in electrical communication with a fourth position (R4) of the first bridge circuit (206);
a fourth strain gage (200D) of the two or more strain gages (200A-H) is coupled to a proximal surface (134'B) of an outlet leg (134') of the second flow tube of the one or more rigid flow tubes (130, 130'), wherein the fourth strain gage (200D) is in electrical communication with a fourth position (R4') of the second bridge circuit (206'); and
the first and second bridge circuits (206, 206') are in electrical communication with meter electronics (20).

14. The flowmeter (5) of claim 1, wherein:
a first strain gage (200A) of the two or more strain gages (200A-H) is coupled to a distal surface (131A) of an inlet leg (131) of a first flow tube of the one or more rigid flow tubes (130, 130'), wherein the first strain gage (200A) is in electrical communication with a first position (R1) of a first bridge circuit (206) of the one or more bridge circuits (206, 206');
a second strain gage (200B) of the two or more strain gages (200A-H) is coupled to a distal surface (134A) of an outlet leg (134) of the first flow tube of the one or more rigid flow tubes (130, 130'), wherein the second strain gage (200B) is in electrical communication with a first position (R1') of a second bridge circuit (206') of the one or more bridge circuits (206, 206');
a third strain gage (200C) of the two or more strain gages (200A-H) is coupled to a proximal surface (131'B) of an inlet leg (131') of a second flow tube of the one or more rigid flow tubes (130, 130'), wherein the third strain gage (200C) is in electrical communication with a second position (R2) of the first bridge circuit (206);
a fourth strain gage (200D) of the two or more strain gages (200A-H) is coupled to a proximal surface (134'B) of an outlet leg (134') of the second flow tube of the one or more rigid flow tubes (130, 130'), wherein the fourth strain gage (200D) is in electrical communication with a fourth position (R4') of the second bridge circuit (206'); and
the first and second bridge circuits (206, 206') are in electrical communication with meter electronics (20).

15. The flowmeter (5) of claim 1, wherein:
a first strain gage (200A) of the two or more strain gages (200A-H) is coupled to a distal surface (131A) of an inlet leg (131) of a first flow tube of the one or more rigid flow tubes (130, 130'), wherein the first strain gage (200A) is in electrical communication with a first position (R1) of a first bridge circuit (206) of the one or more bridge circuits (206, 206');
a second strain gage (200B) of the two or more strain gages (200A-H) is coupled to a distal surface (134A) of an outlet leg (134) of the first flow tube of the one or more rigid flow tubes (130, 130'), wherein the second strain gage (200B) is in electrical communication with a first position (R1') of a second bridge circuit (206') of the one or more bridge circuits (206, 206');
a third strain gage (200C) of the two or more strain gages (200A-H) is coupled to a proximal surface (131'B) of an inlet leg (131') of a second flow tube of the one or more rigid flow tubes (130, 130'), wherein the third strain gage (200C) is in electrical communication with a fourth position (R4) of the first bridge circuit (206);
a fourth strain gage (200D) of the two or more strain gages (200A-H) is coupled to a proximal surface (134'B) of an outlet leg (134') of the second flow tube of the one or more rigid flow tubes (130, 130'), wherein the fourth strain gage (200D) is in electrical communication with a second position (R2') of the second bridge circuit (206'); and
the first and second bridge circuits (206, 206') are in electrical communication with meter electronics (20).

16. The flowmeter (5) of claim 1, wherein:
a first strain gage (200A) of the two or more strain gages (200A-H) is coupled to a distal surface (131A) of an inlet leg (131) of a first flow tube of the one or more rigid flow tubes (130, 130'), wherein the first strain gage (200A) is in electrical communication with a first position (R1) of a first bridge circuit (206) of the one or more bridge circuits (206, 206');
a second strain gage (200B) of the two or more strain gages (200A-H) is coupled to a distal surface (134A) of an outlet leg (134) of the first flow tube of the one or more rigid flow tubes (130, 130'), wherein the second strain gage (200B) is in electrical communication with a first position (R1') of a second bridge circuit (206') of the one or more bridge circuits (206, 206');
a third strain gage (200C) of the two or more strain gages (200A-H) is coupled to a proximal surface (131'B) of an inlet leg (131') of a second flow tube of the one or more rigid flow tubes (130, 130'), wherein the third strain gage (200C) is in electrical communication with a second position (R2) of the first bridge circuit (206);
a fourth strain gage (200D) of the two or more strain gages (200A-H) is coupled to a proximal surface (134'B) of an outlet leg (134') of the second flow tube of the one or more rigid flow tubes (130, 130'), wherein the fourth strain gage (200D) is in electrical communication with a second position (R2') of the second bridge circuit (206'); and
the first and second bridge circuits (206, 206') are in electrical communication with meter electronics (20).

17. The flowmeter (5) of claim 1, wherein:
a first strain gage (200A) of the two or more strain gages (200A-H) is coupled to a distal surface (131A) of an inlet leg (131) of a first flow tube of the one or more rigid flow tubes (130, 130'), wherein the first strain gage (200A) is in electrical communication with a first position (R1) of a first bridge circuit (206) of the one or more bridge circuits (206, 206');
a second strain gage (200B) of the two or more strain gages (200A-H) is coupled to a distal surface (134A) of an outlet leg (134) of the first flow tube of the one or more rigid flow tubes (130, 130'), wherein the second strain gage (200B) is in electrical communication with a first position (R1') of a second bridge circuit (206') of the one or more bridge circuits (206, 206');
a third strain gage (200C) of the two or more strain gages (200A-H) is coupled to a proximal surface (131'B) of an inlet leg (131') of a second flow tube of the one or more rigid flow tubes (130, 130'), wherein the third strain gage (200C) is in electrical communication with a third position (R3) of the first bridge circuit (206);
a fourth strain gage (200D) of the two or more strain gages (200A-H) is coupled to a proximal surface (134'B) of an outlet leg (134') of the second flow tube of the one or more rigid flow tubes (130, 130'), wherein the fourth strain gage (200D) is in electrical communication with a third position (R3') of the second bridge circuit (206');
a fifth strain gage (200E) of the two or more strain gages (200A-H) is coupled to a proximal surface (131B) of an inlet leg (131) of the first flow tube of the one or more rigid flow tubes (130, 130'), wherein the fifth strain gage (200E) is in electrical communication with a second position (R2) of the first bridge circuit (206);
a sixth strain gage (200F) of the two or more strain gages (200A-H) is coupled to a proximal surface (134B) of an outlet leg (134) of the first flow tube of the one or more rigid flow tubes (130, 130'), wherein the sixth strain gage (200F) is in electrical communication with a second position (R2') of the second bridge circuit (206');
a seventh strain gage (200G) of the two or more strain gages (200A-H) is coupled to a distal surface (131'A) of an inlet leg (131') of the second flow tube of the one or more rigid flow tubes (130, 130'), wherein the seventh strain gage (200G) is in electrical communication with a fourth position (R4) of the first bridge circuit (206);
an eighth strain gage (200H) of the two or more strain gages (200A-H) is coupled to a distal surface (134'A) of an outlet leg (134') of the second flow tube of the one or more rigid flow tubes (130, 130'), wherein the eighth strain gage (200H) is in electrical communication with a fourth position (R4') of the second bridge circuit (206'); and
the first and second bridge circuits (206, 206') are in electrical communication with meter electronics (20).

18. The flowmeter (5) of claim 1, wherein:
a first strain gage (200A) of the two or more strain gages (200A-H) is coupled to a distal surface (131A) of an inlet leg (131) of a first flow tube of the one or more rigid flow tubes (130, 130'), wherein the first strain gage (200A) is in electrical communication with a first position (R1) of a first bridge circuit (206) of the one or more bridge circuits (206, 206');
a second strain gage (200B) of the two or more strain gages (200A-H) is coupled to a distal surface (134A) of an outlet leg (134) of the first flow tube of the one or more rigid flow tubes (130, 130'), wherein the second strain gage (200B) is in electrical communication with a second position (R2) of the first bridge circuit (206); and
the first bridge circuit (206) is in electrical communication with meter electronics (20).

19. The flowmeter (5) of claim 1, wherein:
a first strain gage (200A) of the two or more strain gages (200A-H) is coupled to a distal surface (131A) of an inlet leg (131) of a first flow tube of the one or more rigid flow tubes (130, 130'), wherein the first strain gage (200A) is in electrical communication with a second position (R2) of a first bridge circuit (206) of the one or more bridge circuits (206, 206');
a second strain gage (200B) of the two or more strain gages (200A-H) is coupled to a distal surface (134A) of an outlet leg (134) of the first flow tube of the one or more rigid flow tubes (130, 130'), wherein the second strain gage (200B) is in electrical communication with a first position (R1) of a the first bridge circuit (206);
a third strain gage (200G) of the two or more strain gages (200A-H) is coupled to a distal surface (131'A) of an inlet leg (131') of second flow tube of the one or more rigid flow tubes (130, 130'), wherein the third strain gage (200G) is in electrical communication with a third position (R3) of the first bridge circuit (206);
a fourth strain gage (200H) of the two or more strain gages (200A-H) is coupled to a distal surface (134'A) of an outlet leg (134') of the second flow tube of the one or more rigid flow tubes (130, 130'), wherein the fourth strain gage (200H) is in electrical communication with a fourth position (R4) of the first bridge circuit (206); and
the first and second bridge circuits (206, 206') are in electrical communication with meter electronics (20).

20. A flowmeter (meter) including a sensor assembly (10) and a meter electronics (20), comprising:
one or more rigid flow tubes (130, 130');
a driver (180) coupled to the one or more rigid flow tubes (130, 130') and oriented to induce a strain in the one or more rigid flow tubes (130, 130');
two or more strain gages (200A-H) coupled to the one or more rigid flow tubes (130, 130'), wherein the two or more strain gages (200A-H) are configured to output a signal whose amplitude is proportional to a mass flow through the one or more rigid flow tubes (130, 130');
a circuit in electrical communication with the two or more strain gages (200A-H), wherein the circuit cancels out common mode strain effects between the two or more strain gages, wherein an out-of-phase strain on the two or more strain gages (200A-H) due to mass flow is amplified.

21. The flowmeter (5) of claim 20, wherein the signal output from the two or more strain gages (200A-H) is a resistance having an amplitude proportional to the mass flow through the one or more rigid flow tubes (130, 130').

22. The flowmeter (5) of claim 20, wherein the circuit comprises one or more bridge circuits (206, 206') in electrical communication with the two or more strain gages (200A-H), wherein an output of the one or more bridge circuits (206, 206') has an amplitude proportional to a strain detected by at least one of the two or more strain gages (200A-H).

23. The flowmeter (5) of claim 22, wherein the one or more bridge circuits (206, 206') outputs a voltage having an amplitude that is proportional to the strain detected by at least one of the two or more strain gages (200A-H).

24. The flowmeter (5) of claim 20, wherein the circuit further comprises:
a high-pass filter to substantially block a DC component of the signal;
an analog to digital converter (450); and
an low-pass filter to prevent signals with frequencies greater than the sampling rate of the analog to digital converter (450) from being input into the analog to digital converter (450).

25. The flowmeter (5) of claim 20, further comprising a high-pass filter (430) with the meter electronics (20) to eliminate a DC offset.

26. The flowmeter (5) of claim 20, wherein the circuit electrically subtracts a vibrational response of a first of the two or more strain gages (200A-H) from a vibrational response of a second of the two or more strain gages (200A-H) to yield a voltage having an amplitude A, comprising $A = \sqrt{\alpha_1^2 + \alpha_2^2 \pm 2\alpha_1\alpha_2\cos(\Phi)}$, wherein:
$\alpha_1$ is a first amplitude of the first of the one or more bridge circuits (206, 206') at a drive frequency;
$\alpha_2$ is a second amplitude of the second of the one or more bridge circuits (206, 206') at the drive frequency; and Φ is a phase difference between an output of the first of the one or more bridge circuits (206, 206') and the second of the one or more bridge circuits (206, 206').

27. A method for determining flow through one or more rigid flow tubes in a flowmeter, comprising the steps of:
vibrating at least one of the one or more rigid flow tubes in a drive mode vibration;
providing at least two strain gages;
receiving strain sensor signals based on a vibrational response to the drive mode vibration from the at least two strain gages;
inputting at least two strain sensor signals into at least one bridge circuit;
calculating a phase difference between strain sensor signals;
generating an output signal from the at least one bridge circuit; and
determining a mass flow from the output signal.

28. The method for determining flow through one or more rigid flow tubes in the flowmeter of claim 27, further comprising the step of filtering the output signal of the at least one bridge circuit with a high-pass filter to eliminate a DC offset.

29. The method for determining flow through one or more rigid flow tubes in the flowmeter of claim 27, further comprising the steps of:
coupling one of the at least two strain gages to one of the one or more rigid flow tubes; and
detecting a strain of the one or more rigid flow tubes that is approximately parallel with the longitudinal axis of the one of the one or more rigid flow tubes.

30. The method for determining flow through one or more rigid flow tubes in the flowmeter of claim 29, wherein the step of coupling one of the at least two strain gages to one of the one or more rigid flow tubes comprises coupling the one of the at least two strain gages proximate a brace bar.

31. The method for determining flow through one or more rigid flow tubes in the flowmeter of claim 30, wherein the step of coupling the one of the at least two strain gages to one of the one or more rigid flow tubes comprises coupling the one of the at least two strain gages to the rigid flow tube between about 0% and 15% of a distance from the brace bar to a top of the flow tube measured from the brace bar along a vector perpendicular to a flow tube flow direction at the flow tube uppermost portion.

32. The method for determining flow through one or more rigid flow tubes in the flowmeter of claim 30, wherein the step of coupling the one of the at least two strain gages to one of the one or more rigid flow tubes comprises coupling the one of the at least two strain gages to the rigid flow tube is between about 6% and 9% of a distance from the brace bar to a top of the flow tube measured from the brace bar along a vector perpendicular to a flow tube flow direction at the flow tube uppermost portion.

33. The method for determining flow through one or more rigid flow tubes in the flowmeter of claim 30, wherein the one or more rigid flow tubes comprise at least one of a substantially "U" shape and substantially omega shape.

34. The method for determining flow through one or more rigid flow tubes in the flowmeter of claim 27, further comprising the step of electrically subtracting a vibrational response of a first of the at least two strain gages from a vibrational response of a second of the at least two strain gages to yield a voltage having an amplitude A, comprising $A=\sqrt{\alpha_1^2+\alpha_2^2\pm 2\alpha_1\alpha_2\cos(\Phi)}$, wherein:

$\alpha_1$ is a first amplitude of the first of the one or more bridge circuits (206, 206') at a drive frequency;
$\alpha_2$ is a second amplitude of the second of the one or more bridge circuits (206, 206') at the drive frequency; and
Φ is a phase difference between an output of the first of the one or more bridge circuits (206, 206') and the second of the one or more bridge circuits (206, 206').

35. The method for determining flow through one or more rigid flow tubes in the flowmeter of claim 27, further comprising the steps of:
amplifying the output signal to generate an amplified signal;
filtering the amplified signal with a high-pass filter;
filtering the amplified signal with a low-pass filter; and
converting the amplified signal to a digital signal.

36. The method for determining flow through one or more rigid flow tubes in the flowmeter of claim 27, further comprising the steps of:
providing a first strain gage of the at least two strain gages;
coupling the first strain gage to a distal surface of an inlet leg of one of the one or more rigid flow tubes, wherein the first strain gage is in electrical communication with a first position of a first of the at least one bridge circuit;
providing a first strain gage of the at least two strain gages;
providing a second strain gage of the at least two strain gages;
coupling the second strain gage to a distal surface of an outlet leg of one of the one or more rigid flow tubes, wherein the second strain gage is in electrical communication with a first position of a second of the at least one bridge circuit.

37. The method for determining flow through one or more rigid flow tubes in the flowmeter of claim 27, further comprising the steps of:
providing a first strain gage of the at least two strain gages;
coupling the first strain gage to a distal surface of an inlet leg of one of the one or more rigid flow tubes, wherein the first strain gage is in electrical communication with a first position of a first of the at least one bridge circuit;
providing a first strain gage of the at least two strain gages;
providing a second strain gage of the at least two strain gages;
coupling the second strain gage to a proximal surface of an outlet leg of one of the one or more rigid flow tubes, wherein the second strain gage is in electrical communication with a first position of a second of the at least one bridge circuit.

38. The method for determining flow through one or more rigid flow tubes in the flowmeter of claim 27, further comprising the steps of:
providing a first strain gage of the at least two strain gages;
coupling the first strain gage to a proximal surface of an inlet leg of one of the one or more rigid flow tubes, wherein the first strain gage is in electrical communication with a first position of a first of the at least one bridge circuit;
providing a second strain gage of the at least two strain gages;
coupling the second strain gage to a proximal surface of an outlet leg of one of the one or more rigid flow tubes, wherein the second strain gage is in electrical communication with a first position of a second of the at least one bridge circuit.

39. The method for determining flow through one or more rigid flow tubes in the flowmeter of claim 27, further comprising the steps of:
providing a first strain gage of the two or more strain gages;
coupling the first strain gage to a distal surface of an inlet leg of a first flow tube of the one or more rigid flow tubes, wherein the first strain gage is in electrical communication with a first position of a first bridge circuit of the at least one bridge circuit;
providing a second strain gage of the two or more strain gages;
coupling the second strain gage to a distal surface of an outlet leg of the first flow tube of the one or more rigid flow tubes, wherein the second strain gage is in electrical communication with a first position of a second bridge circuit of the at least one bridge circuit;
providing a third strain gage of the two or more strain gages;
coupling the third strain gage to a distal surface of an inlet leg of a second flow tube of the one or more rigid flow tubes, wherein the third strain gage is in electrical communication with a third position of the first bridge circuit;
providing a fourth strain gage of the two or more strain gages; and
coupling the fourth strain gage to a distal surface of an outlet leg of the second flow tube of the one or more rigid flow tubes, wherein the fourth strain gage is in electrical communication with a third position of the second bridge circuit.

40. The method for determining flow through one or more rigid flow tubes in the flowmeter of claim 27, further comprising the steps of:
providing a first strain gage of the two or more strain gages;
coupling the first strain gage to a distal surface of an inlet leg of a first flow tube of the one or more rigid flow tubes, wherein the first strain gage is in electrical communication with a first position of a first bridge circuit of the at least one bridge circuit;
providing a second strain gage of the two or more strain gages;
coupling the second strain gage to a distal surface of an outlet leg of the first flow tube of the one or more rigid flow tubes, wherein the second strain gage is in electrical communication with a first position of a second bridge circuit of the at least one bridge circuit;
providing a third strain gage of the two or more strain gages;
coupling the third strain gage to a proximal surface of an inlet leg of a second flow tube of the one or more rigid flow tubes, wherein the third strain gage is in electrical communication with a fourth position of the first bridge circuit;
providing a fourth strain gage of the two or more strain gages; and
coupling the fourth strain gage to a proximal surface of an outlet leg of the second flow tube of the one or more rigid flow tubes, wherein the fourth strain gage is in electrical communication with a fourth position of the second bridge circuit.

41. The method for determining flow through one or more rigid flow tubes in the flowmeter of claim 27, further comprising the steps of:
providing a first strain gage of the two or more strain gages;
coupling the first strain gage to a distal surface of an inlet leg of a first flow tube of the one or more rigid flow tubes, wherein the first strain gage is in electrical communication with a first position of a first bridge circuit of the at least one bridge circuit;
providing a second strain gage of the two or more strain gages;
coupling the second strain gage to a distal surface of an outlet leg of the first flow tube of the one or more rigid flow tubes, wherein the second strain gage is in electrical communication with a first position of a second bridge circuit of the at least one bridge circuit;
providing a third strain gage of the two or more strain gages;
coupling the third strain gage to a proximal surface of an inlet leg of a second flow tube of the one or more rigid flow tubes, wherein the third strain gage is in electrical communication with a second position of the first bridge circuit;
providing a fourth strain gage of the two or more strain gages; and
coupling the fourth strain gage to a proximal surface of an outlet leg of the second flow tube of the one or more rigid flow tubes, wherein the fourth strain gage is in electrical communication with a fourth position of the second bridge circuit.

42. The method for determining flow through one or more rigid flow tubes in the flowmeter of claim 27, further comprising the steps of:
providing a first strain gage of the two or more strain gages;
coupling the first strain gage to a distal surface of an inlet leg of a first flow tube of the one or more rigid flow tubes, wherein the first strain gage is in electrical communication with a first position of a first bridge circuit of the at least one bridge circuit;
providing a second strain gage of the two or more strain gages;
coupling the second strain gage to a distal surface of an outlet leg of the first flow tube of the one or more rigid flow tubes, wherein the second strain gage is in electrical communication with a first position of a second bridge circuit of the at least one bridge circuit;
providing a third strain gage of the two or more strain gages;
coupling the third strain gage to a proximal surface of an inlet leg of a second flow tube of the one or more rigid flow tubes, wherein the third strain gage is in electrical communication with a fourth position of the first bridge circuit;
providing a fourth strain gage of the two or more strain gages; and
coupling the fourth strain gage to a proximal surface of an outlet leg of the second flow tube of the one or more rigid flow tubes, wherein the fourth strain gage is in electrical communication with a second position of the second bridge circuit.

43. The method for determining flow through one or more rigid flow tubes in the flowmeter of claim 27, further comprising the steps of:
providing a first strain gage of the two or more strain gages;

coupling the first strain gage to a distal surface of an inlet leg of a first flow tube of the one or more rigid flow tubes, wherein the first strain gage is in electrical communication with a first position of a first bridge circuit of the at least one bridge circuit;

providing a second strain gage of the two or more strain gages;

coupling the second strain gage to a distal surface of an outlet leg of the first flow tube of the one or more rigid flow tubes, wherein the second strain gage is in electrical communication with a first position of a second bridge circuit of the at least one bridge circuit;

providing a third strain gage of the two or more strain gages;

coupling the third strain gage to a proximal surface of an inlet leg of a second flow tube of the one or more rigid flow tubes, wherein the third strain gage is in electrical communication with a second position of the first bridge circuit;

providing a fourth strain gage of the two or more strain gages; and coupling the fourth strain gage to a proximal surface of an outlet leg of the second flow tube of the one or more rigid flow tubes, wherein the fourth strain gage is in electrical communication with a second position of the second bridge circuit.

44. The method for determining flow through one or more rigid flow tubes in the flowmeter of claim 27, further comprising the steps of:

providing a first strain gage of the two or more strain gages;

coupling the first strain gage to a distal surface of an inlet leg of a first flow tube of the one or more rigid flow tubes, wherein the first strain gage is in electrical communication with a first position of a first bridge circuit of the at least one bridge circuit;

providing a second strain gage of the two or more strain gages;

coupling the second strain gage to a distal surface of an outlet leg of the first flow tube of the one or more rigid flow tubes, wherein the second strain gage is in electrical communication with a first position of a second bridge circuit of the at least one bridge circuit;

providing a third strain gage of the two or more strain gages;

coupling the third strain gage to a proximal surface of an inlet leg of a second flow tube of the one or more rigid flow tubes, wherein the third strain gage is in electrical communication with a third position of the first bridge circuit;

providing a fourth strain gage of the two or more strain gages;

coupling the fourth strain gage to a proximal surface of an outlet leg of the second flow tube of the one or more rigid flow tubes, wherein the fourth strain gage is in electrical communication with a third position of the second bridge circuit;

providing a fifth strain gage of the two or more strain gages;

coupling the fifth strain gage to a proximal surface of an inlet leg of the first flow tube of the one or more rigid flow tubes, wherein the fifth strain gage is in electrical communication with a second position of the first bridge circuit;

providing a sixth strain gage of the two or more strain gages;

coupling the sixth strain gage to a proximal surface of an outlet leg of the first flow tube of the one or more rigid flow tubes, wherein the sixth strain gage is in electrical communication with a second position of the second bridge circuit;

providing a seventh strain gage of the two or more strain gages;

coupling the seventh strain gage to a distal surface of an inlet leg of the second flow tube of the one or more rigid flow tubes, wherein the seventh strain gage is in electrical communication with a fourth position of the first bridge circuit;

providing an eighth strain gage of the two or more strain gages; and coupling the eighth strain gage to a distal surface of an outlet leg of the second flow tube of the one or more rigid flow tubes, wherein the eighth strain gage is in electrical communication with a fourth position of the second bridge circuit.

45. A method for determining flow through one or more rigid flow tubes in a flowmeter, comprising the steps of:

vibrating at least one of the one or more rigid flow tubes in a drive mode vibration;

providing at least two strain gages;

receiving strain sensor signals based on a vibrational response to the drive mode vibration from the at least two strain gages;

inputting at least two strain sensor signals into a bridge circuit;

generating an output signal from the bridge circuit, wherein the output signal comprises a change in voltage amplitude; and determining a mass flow from the output signal.

46. The method for determining flow through one or more rigid flow tubes in the flowmeter of claim 45, further comprising the steps of:

providing a first strain gage of the two or more strain gages;

coupling the first strain gage to a distal surface of an inlet leg of a first flow tube of the one or more rigid flow tubes, wherein the first strain gage is in electrical communication with a first position of the bridge circuit; and providing a second strain gage of the two or more strain gages;

coupling the second strain gage to a distal surface of an outlet leg of the first flow tube of the one or more rigid flow tubes, wherein the second strain gage is in electrical communication with a second position of the bridge circuit.

47. The method for determining flow through one or more rigid flow tubes in the flowmeter of claim 45, further comprising the steps of:

providing a first strain gage of the two or more strain gages;

coupling the first strain gage to a distal surface of an inlet leg of a first flow tube of the one or more rigid flow tubes, wherein the first strain gage is in electrical communication with a second position of the bridge circuit;

providing a second strain gage of the two or more strain gages;

coupling second first strain gage to a distal surface of an outlet leg of the first flow tube of the one or more rigid flow tubes, wherein the second strain gage is in electrical communication with a first position of the bridge circuit;

providing a third strain gage of the two or more strain gages;

coupling the third strain gage to a distal surface of an inlet leg of a second flow tube of the one or more rigid flow tubes, wherein the third strain gage is in electrical communication with a third position of the bridge circuit;

providing a fourth strain gage of the two or more strain gages; and coupling the fourth strain gage to a distal surface of an outlet leg of the second flow tube of the one or more rigid flow tubes, wherein the fourth strain gage is in electrical communication with a fourth position of the bridge circuit.

* * * * *